US011012126B2

(12) United States Patent
Rahman et al.

(10) Patent No.: US 11,012,126 B2
(45) Date of Patent: May 18, 2021

(54) METHOD AND APPARATUS FOR BEAM SELECTION FOR CSI REPORTING IN ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/045,543

(22) Filed: Jul. 25, 2018

(65) Prior Publication Data

US 2019/0044587 A1 Feb. 7, 2019

Related U.S. Application Data

(60) Provisional application No. 62/565,497, filed on Sep. 29, 2017, provisional application No. 62/541,465, filed on Aug. 4, 2017.

(51) Int. Cl.
*H04B 7/0456* (2017.01)
*H04B 7/06* (2006.01)
*H04L 27/26* (2006.01)

(52) U.S. Cl.
CPC ......... *H04B 7/0456* (2013.01); *H04B 7/0695* (2013.01); *H04L 27/264* (2013.01); *H04L 27/2605* (2013.01); *H04B 7/0469* (2013.01); *H04L 27/2628* (2013.01)

(58) Field of Classification Search
None
See application file for complete search history.

(56) References Cited

U.S. PATENT DOCUMENTS

| | | | |
|---|---|---|---|
| 9,654,195 B2 * | 5/2017 | Rahman | H04B 7/0478 |
| 2016/0080052 A1 | 3/2016 | Li et al. | |
| 2017/0201308 A1 | 7/2017 | Park et al. | |
| 2018/0131420 A1 * | 5/2018 | Faxer | H04B 7/0469 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 14)," 3GPP TS 36.211, V14.3.0, Jun. 2017, 195 pages.

(Continued)

*Primary Examiner* — Lonnie V Sweet

(57) ABSTRACT

A method of a user equipment (UE) in a wireless communication system is provided, the method comprises receiving, from a base station (BS), configuration information including a number of total beam quantities (N) and a number of selected beam quantities (L), wherein L≤N; calculating an index indicating L selected beam quantities out of N total beam quantities based on the configuration information and a predefined mapping table including combinatorial binomial coefficient values, $$C(x, y) = \binom{x}{y}$$

(i.e., x choose y); and transmitting, to the BS, the index indicating the L selected beam quantities.

20 Claims, 13 Drawing Sheets

(56) References Cited

U.S. PATENT DOCUMENTS

| | | | |
|---|---|---|---|
| 2018/0131486 A1* | 5/2018 | Liu | H04L 5/0048 |
| 2019/0007107 A1* | 1/2019 | Kim | H04L 5/0023 |
| 2019/0068256 A1* | 2/2019 | Muruganathan | H04B 7/0626 |
| 2019/0158161 A1* | 5/2019 | Faxer | H04B 7/0639 |
| 2019/0349042 A1* | 11/2019 | Ramireddy | H04B 7/0478 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 14)," 3GPP TS 36.212, V14.3.0, Jun. 2017, 198 pages.

"3rd Generation Partnership Project; Technical Specification Group Radio Access Network; Evolved Universal Terrestrial Radio Access (E-UTRA); Physical Layer Procedures (Release 14)," 3GPP TS 36.213, V14.3.0, Jun. 2017, 545 pages.

"3rd Generation Partnership Project; Technical Specification Group Radio Access Network; Evolved Universal Terrestrial Radio Access (E-UTRA); Medium Access Control (MAC) Protocol Specification (Release 14)," 3GPP TS 36.321, V14.3.0, Jun. 2017, 107 pages.

"3rd Generation Partnership Project; Technical Specification Group Radio Access Network; Evolved Universal Terrestrial Radio Access (E-UTRA); Radio Resource Control (RRC) Protocol Specification (Release 14)," 3GPP TS 36.331, V14.3.0, Jun. 2017, 745 pages.

"3rd Generation Partnership Project; Technical Specification Group Services and System Aspects; Feasibility Study on New Services and Markets Technology Enablers; Stage 1 (Release 14)," 3GPP TS 22.891, V1.2.0, Nov. 2015, 96 pages.

"Draft Report of 3GPP TSG RAN WG1 #89 v0.2.0 (Hangzhou, China, May 15-19, 2017)," MCC Support, 3GPP TSG RAN WG1 Meeting #90, R1-171xxx, Prague, Czech Republic, Aug. 21-25, 2017, 166 pages.

ISA/KR, "International Search Report," International Application No. PCT/KR2018-008685, dated Nov. 20, 2018, 3 pages.

CATT, "Discussion on DL beam management," R1-1707475, 3GPP TSG RAN WG1 Meeting #89, Hangzhou, China, May 15-19, 2017, 11 pages.

Ericsson, "Codebook design for Type II CSI feedback," R1-1708688, 3GPP TSG-RAN WG1 #89, Hangzhou, China, May 15-19, 2017, 12 pages.

Samsung, "Measurement and reporting for beam management," R1-1710656, 3GPP TSG RAN WG1 NR Ad-Hoc#2, Qingdao, China, Jun. 27-30, 2017, 5 pages.

Ericsson, "Encoding and mapping of CSI parameters", 3GPP TSG-RAN WG1 #89ah-NR, Jun. 27-30, 2017, R1-1711030, 4 pages.

Supplementary European Search Report dated May 15, 2020 in connection with European Patent Application No. 18 84 0501, 8 pages.

* cited by examiner

METHOD AND APPARATUS FOR BEAM SELECTION FOR CSI REPORTING IN ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/541,465, filed on Aug. 4, 2017; and U.S. Provisional Patent Application Ser. No. 62/565,497, filed on Sep. 29, 2017. The content of the above-identified patent documents is incorporated herein by reference.

TECHNICAL FIELD

The present disclosure relates generally to beam selection for channel state information (CSI) reporting in advanced wireless communication systems.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

SUMMARY

Embodiments of the present disclosure provide methods and apparatuses for beam selection for CSI reporting in an advanced wireless communication system.

In one embodiment, a user equipment (UE) in a wireless communication system is provided. The UE includes a transceiver configured to receive, from a base station (BS), configuration information including a number of total beam quantities (N) and a number of selected beam quantities (L), wherein L≤N. The UE further includes a processor operably connected to the transceiver, the processor configured to calculate an index indicating L selected beam quantities out of N total beam quantities based on the configuration information and a predefined mapping table including combinatorial binomial coefficient values, $$C(x, y) = \binom{x}{y}$$

(i.e., x choose y). The transceiver is further configured to transmit, to the BS, the index indicating the L selected beam quantities.

In another embodiment, a base station (BS) in a wireless communication system is provided. The BS comprises a transceiver configured to transmit, to a user equipment (UE), configuration information including a number of total beam quantities (N) and a number of selected beam quantities (L), wherein L≤N, and receive, from the UE, an index indicating L selected beam quantities, wherein the index indicates the L selected beam quantities out of N total beam quantities that is calculated, at the UE, based on the configuration information and a predefined mapping table including combinatorial binomial coefficient values, $$C(x, y) = \binom{x}{y}$$

(i.e., x choose y).

In yet another embodiment, a method of a user equipment (UE) in a wireless communication system is provided. The method comprises receiving, from a base station (BS), configuration information including a number of total beam quantities (N) and a number of selected beam quantities (L), wherein L≤N, calculating an index indicating L selected beam quantities out of N total beam quantities based on the configuration information and a predefined mapping table including combinatorial binomial coefficient values, $$C(x, y) = \binom{x}{y}$$

(i.e., x choose y), and transmitting, to the BS, the index indicating the L selected beam quantities.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
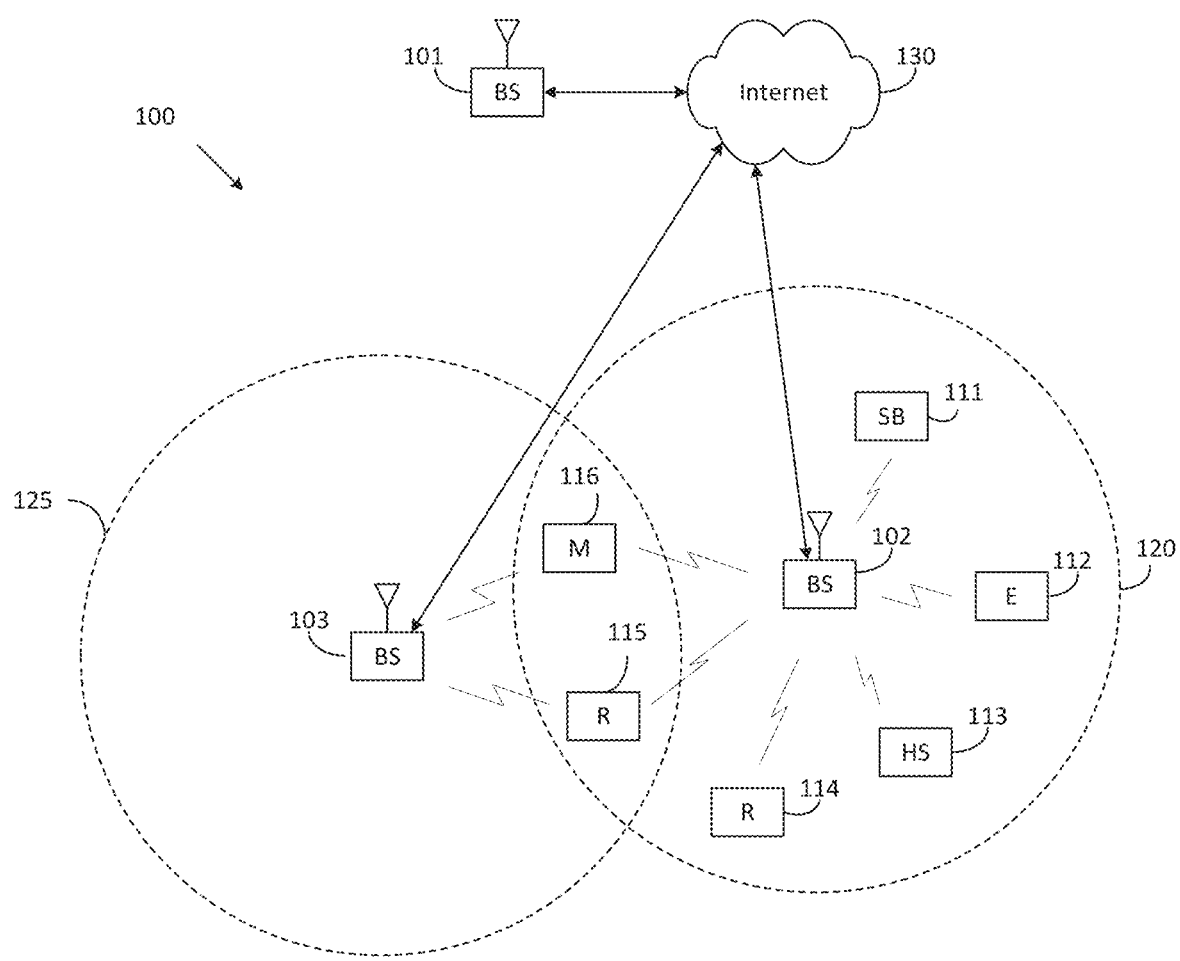
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.3.0, "E-UTRA, Physical channels and modulation;" 3GPP TS 36.212 v14.3.0, "E-UTRA, Multiplexing and Channel coding;" 3GPP TS 36.213 v14.3.0, "E-UTRA, Physical Layer Procedures;" 3GPP TS 36.321 v14.3.0, "E-UTRA, Medium Access Control (MAC) protocol specification;" 3GPP TS 36.331 v14.3.0, "E-UTRA, Radio Resource Control (RRC) protocol specification;" 3GPP TR 22.891 v1.2.0, "Study on New Services and Markets Technology Enablers;" and 3GPP RAN1 meeting #89, Chairman's notes.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
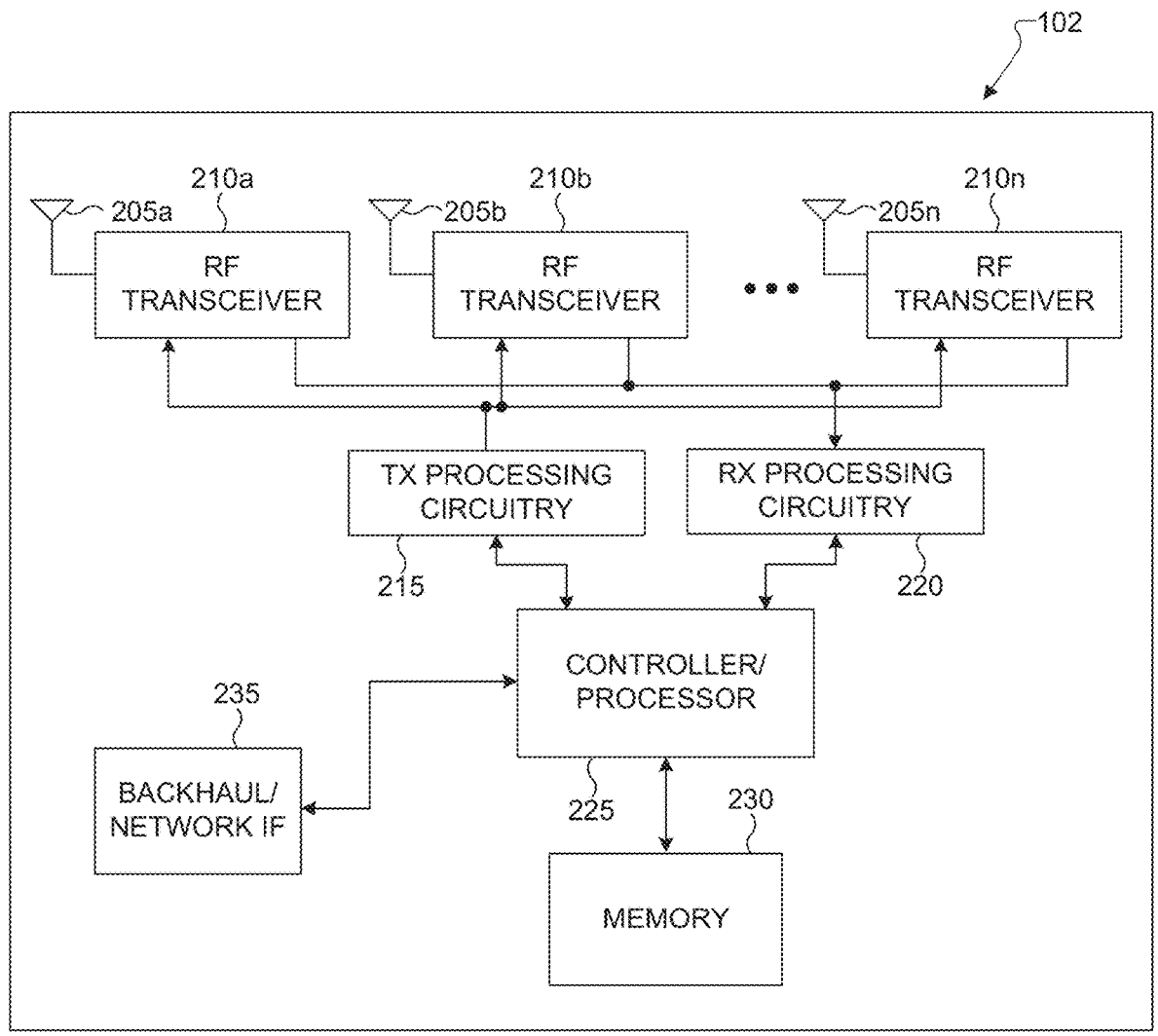
FIG. 2 illustrates an example eNB according to embodiments of the present disclosure.
Figure 3:
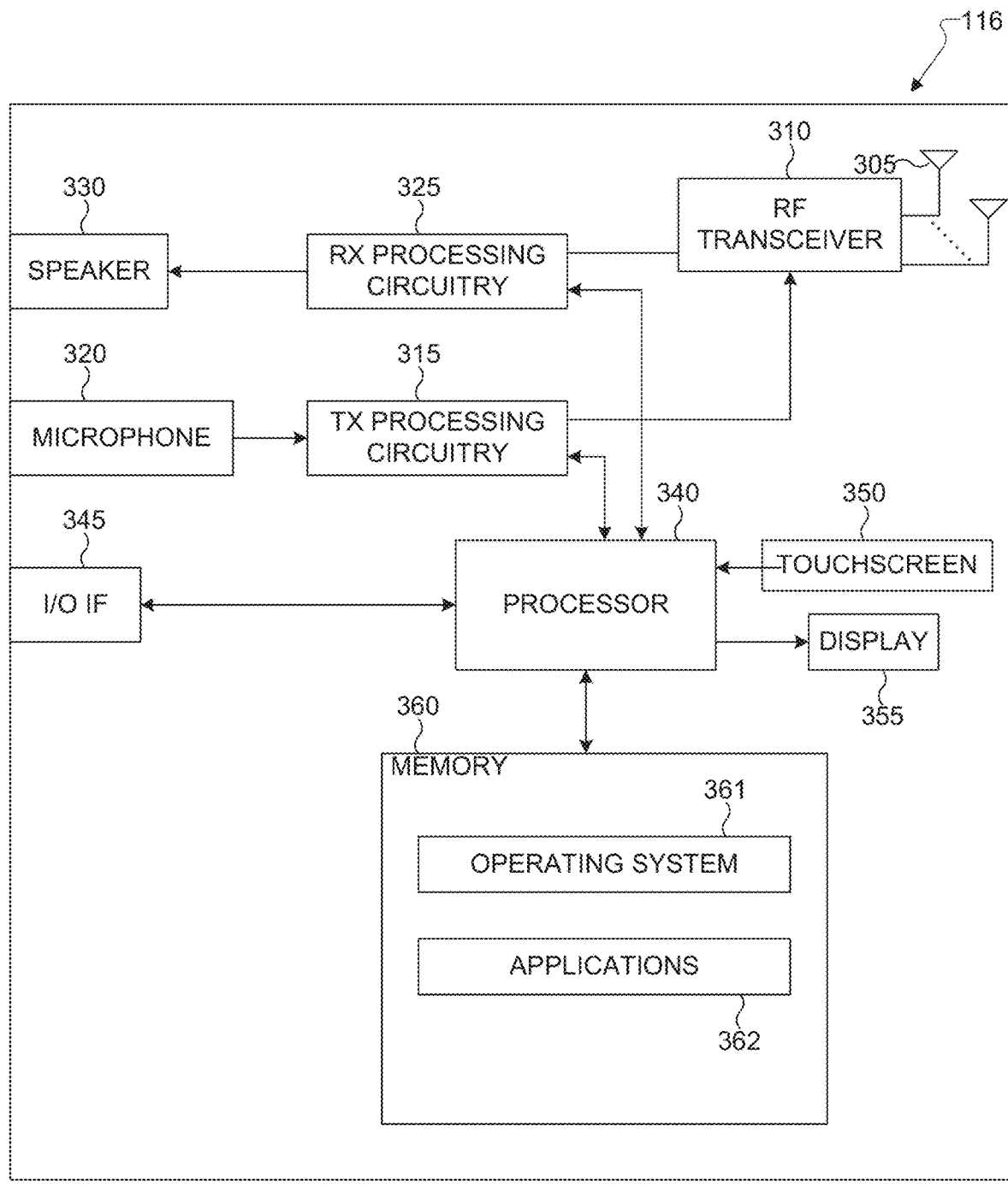
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam selection for CSI reporting in an advanced wireless communication system. In certain embodiments, and one or more of the eNBs 101-103 includes circuitry, programming, or a combination thereof, for receiving efficient CSI reporting based on beam selection scheme in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
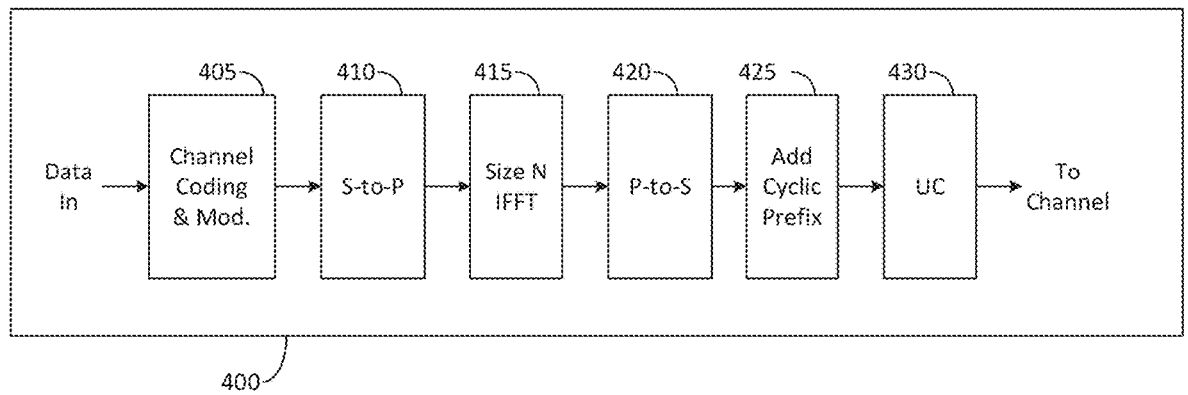
FIG. 4A illustrates a high-level diagram of an orthogonal frequency division multiple access transmit path according to embodiments of the present disclosure.
Figure 4B:
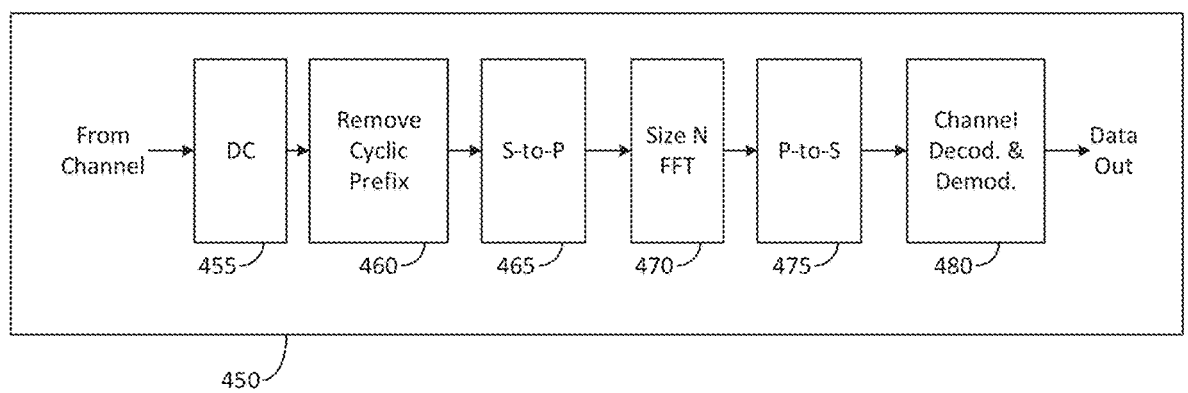
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
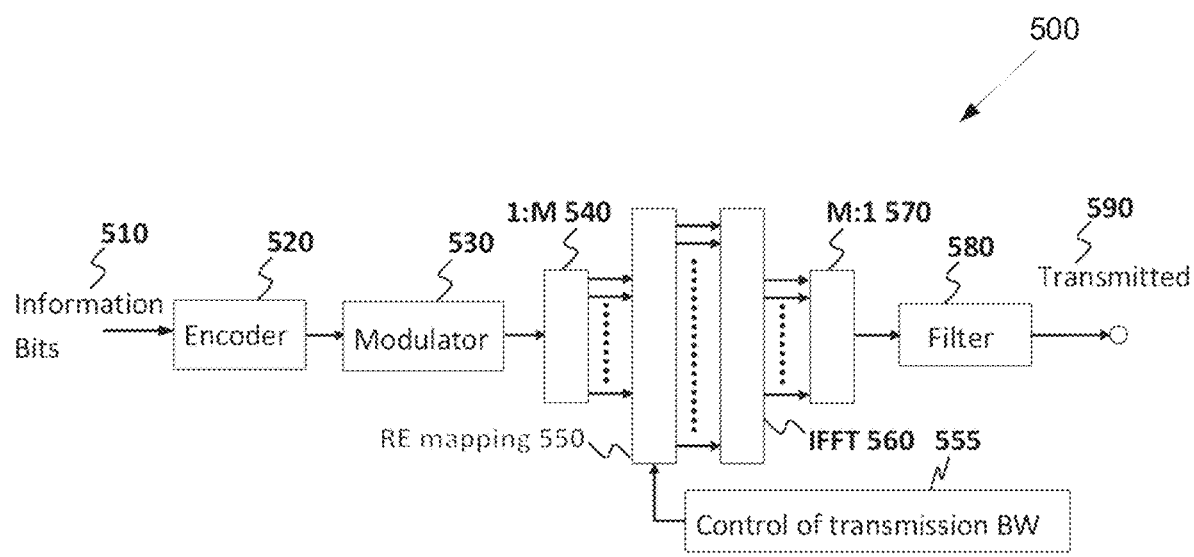
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
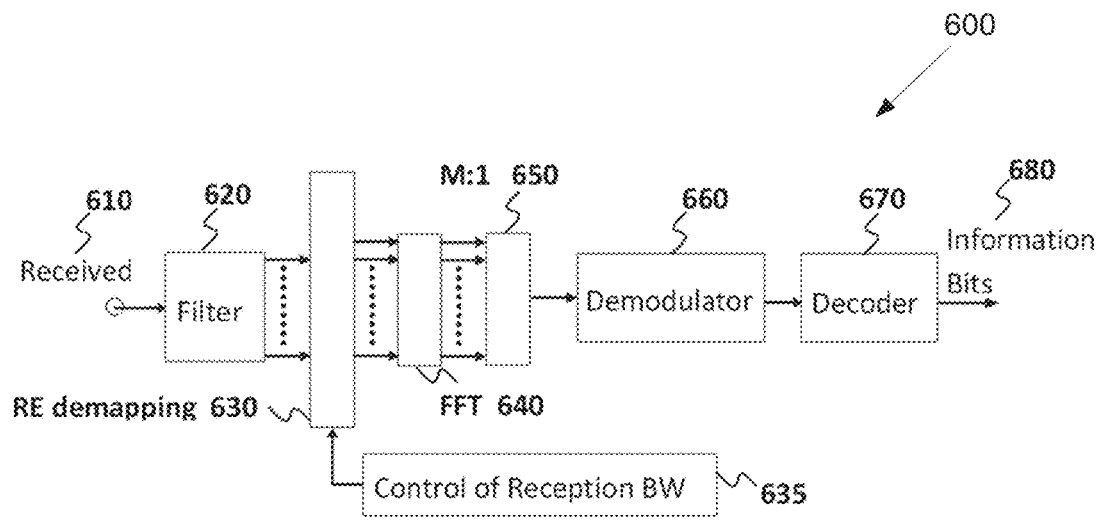
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
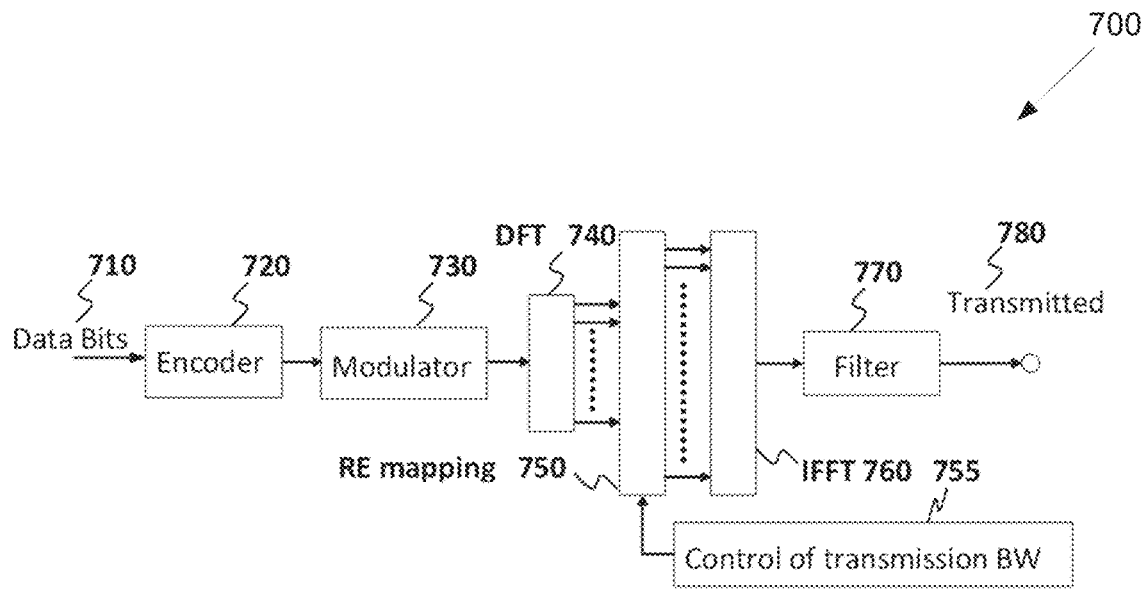
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
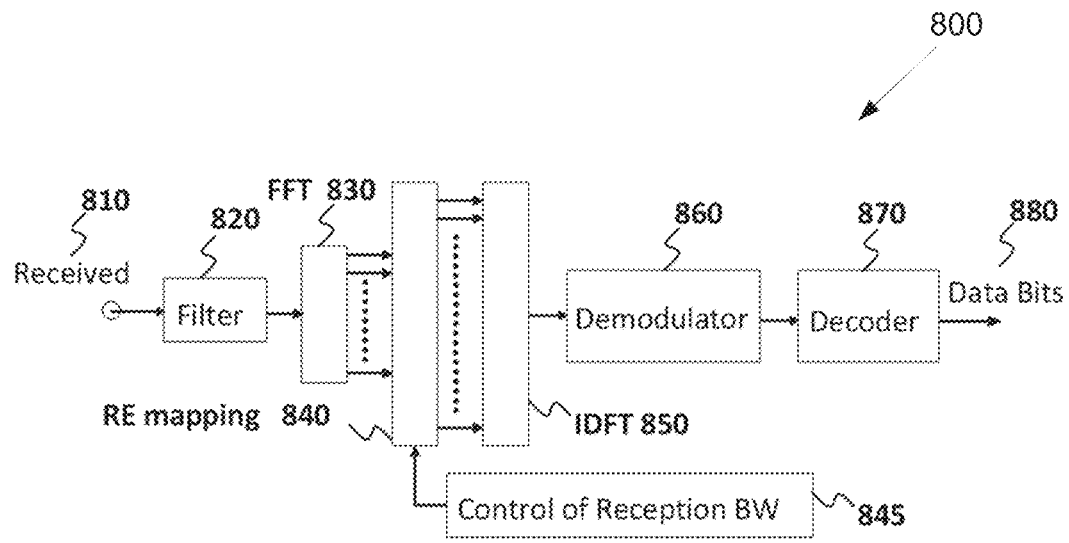
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
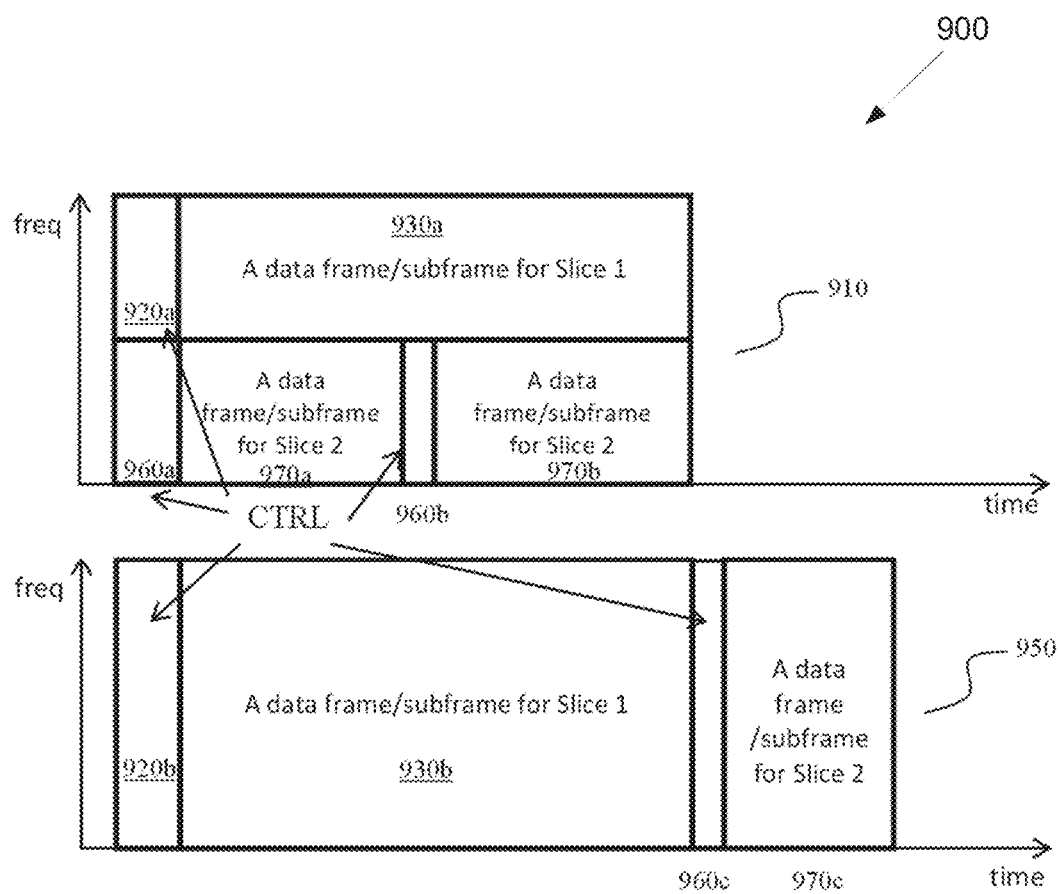
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
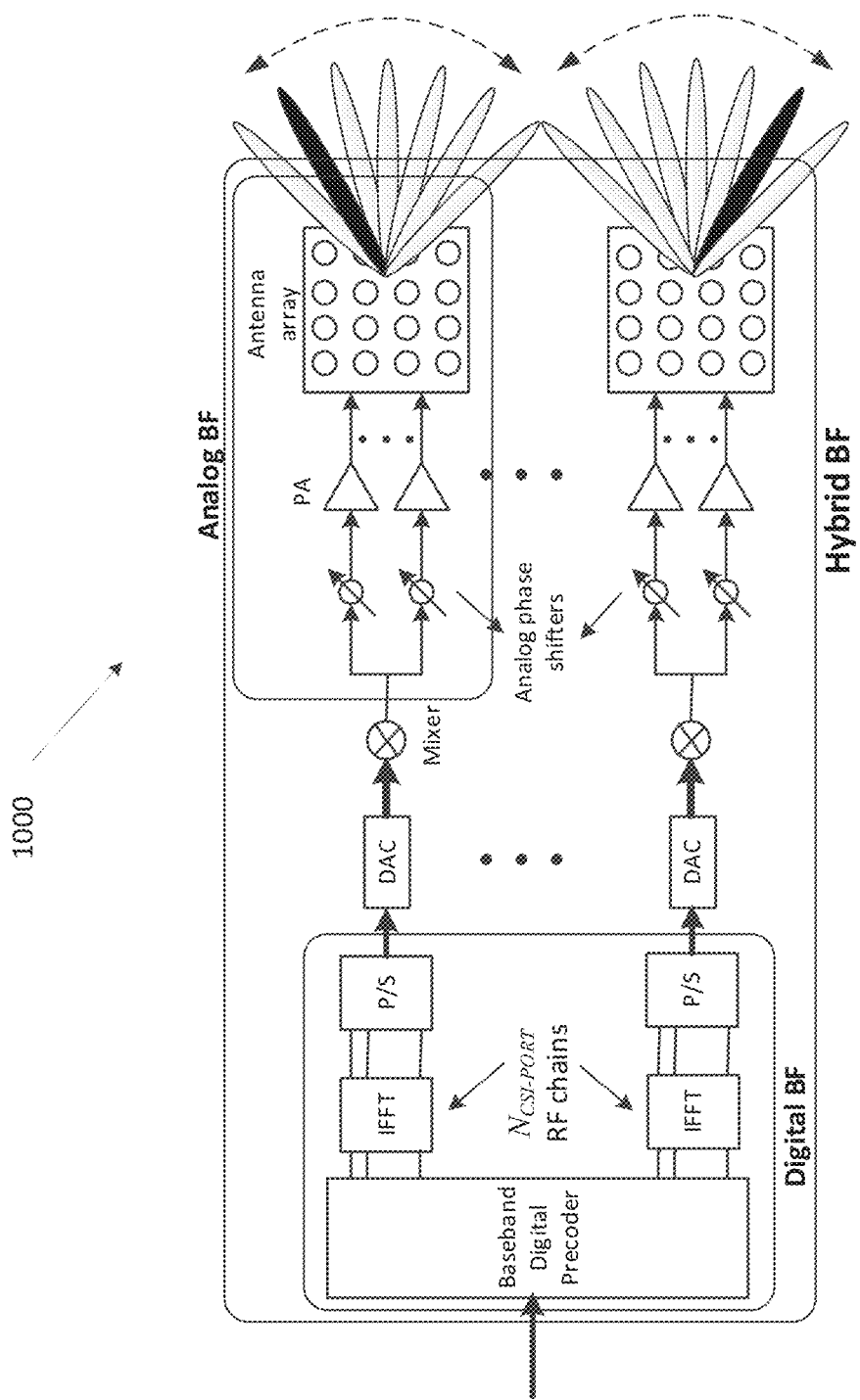
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
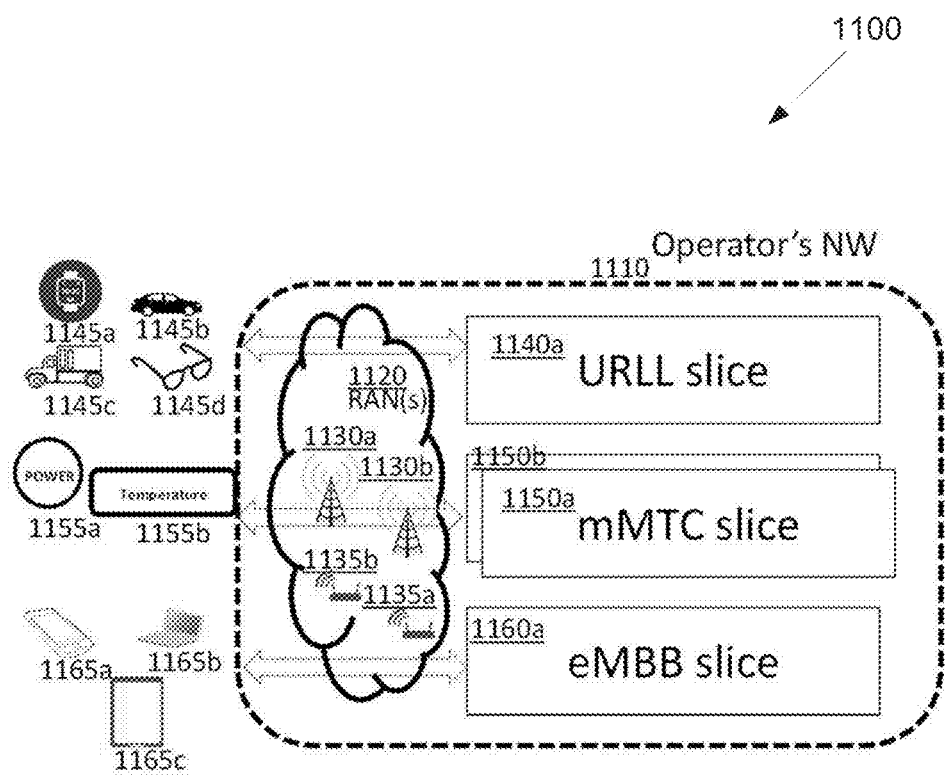
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the block diagram 100.

In order for the 5G network to support such diverse services with different quality of services (QoS), one scheme has been identified in LTE specification, called network slicing.

As shown in FIG. 11, An operator's network 1110 includes a number of radio access network(s) 1120 (RAN(s)) that are associated with network devices such as eNBs 1130*a* and 1130*b*, small cell base stations (femto/pico eNBs or Wi-Fi access points) 1135*a* and 1135*b*. The network 1110 can support various services, each represented as a slice.

In the example, an URLL slice 1140*a* serves UEs requiring URLL services such as cars 1145*b*, trucks 1145*c*, smart watches 1145*a*, and smart glasses 1145*d*. Two mMTC slices 1150*a* and 550*b* serve UEs requiring mMTC services such as power meters 555*b*, and temperature control box 1155*b*. One eMBB slice 1160*a* serves UEs requiring eMBB services such as cells phones 1165*a*, laptops 1165*b*, and tablets 1165*c*. A device configured with two slices can also be envisioned.

From LTE specification, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB. Because of the inherent SU assumption while deriving CSI, this implicit CSI feedback is inadequate for MU transmission. Since future (e.g. NR) systems are likely to be more MU-centric, this SU-MU CSI mismatch may be a bottleneck in achieving high MU performance gains. Another issue with implicit feedback is the scalability with larger number of antenna ports at eNB.

For large number of antenna ports, the codebook design for implicit feedback is quite complicated (for example, in LTE specification, the total number of Class A codebooks=44), and the designed codebook is not guaranteed to bring justifiable performance benefits in practical deployment scenarios (for example, only a small percentage gain can be shown at the most). Realizing aforementioned issues, it has agreed to provide specification support to advanced CSI reporting in LTE specification, which, at the very least, can serve as a good starting point to design advanced CSI scheme in NR MIMO. Compared to LTE specification, the CSI acquisition for NR MIMO may consider the following additional differentiating factors.

In one example of flexibility CSI reporting framework, CSI reporting in NR may be flexible to support users with different CSI reporting capabilities. For example, some users may only be capable of reporting implicit CSI in the form of PMI/CQI/RI as in LTE and some other users may be capable of reporting both implicit as well as explicit channel reporting. In addition, UE motilities in NR can range from 0 kmph to 500 kmph. So, CSI reporting framework may be able to support such diverse use cases and UE capabilities.

In one example of increased number of antenna ports, in NR MIMO, the number of antenna elements at the eNB can be up to 256, which means that the total number of antenna ports can be more than 32, which is the maximum number of antenna ports supported in LTE eFD-MIMO. Although this can be accommodated with partial-port CSI-RS mapping where each subset consists of at most 32 ports, the total number of ports across time can be extended to a much larger number. As the number of ports increases, meaningful system gain can only be obtained in a MU-centric system.

In one example of increased throughput requirement, the system throughput requirements (e.g. for eMBB in NR) is several times more than that for LTE eFD-MIMO. Such high throughput requirements can only met with a mechanism to provide very accurate CSI to the eNB.

In one example of beamforming, following the trend established in FD-MIMO, NR MIMO system may be beam-formed either cell-specifically or UE-specifically, where the beams can either be of analog (RF) or digital or hybrid type. For such a beam-formed system, a mechanism is needed to obtain accurate beam-forming information at the eNB.

In one example of unified design, since NR includes both above and below 6 GHz frequency bands, a unified MIMO framework working for both frequency regimes may be preferable.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals.

Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Figure 12:
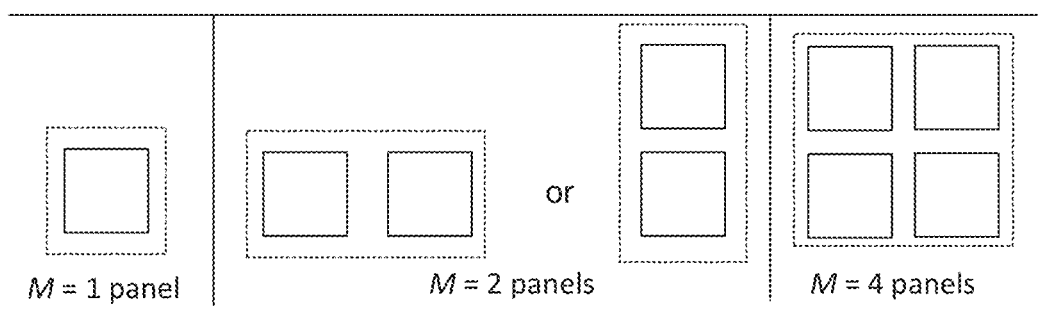
FIG. 12 illustrates an example multiple antenna panels according to embodiments of the present disclosure.

FIG. 12 illustrates an example multiple antenna panels 1200 according to embodiments of the present disclosure. The embodiment of the multiple antenna panels 1200 illustrated in FIG. 12 is for illustration only. FIG. 12 does not limit the scope of this disclosure to any particular implementation.

In the present disclosure, it is assumed that $N_1$ and $N_2$ are the number of antenna ports with the same polarization in the first and second dimensions, respectively. For 2D antenna port layouts, $N_1>1$, $N_2>1$, and for 1D antenna port layouts, $N_1>1$ and $N_2=1$ or $N_2>1$ and $N_1=1$. In the rest of the present disclosure, 1D antenna port layouts with $N_1>1$ and $N_2=1$ is considered. The present disclosure, however, is applicable to the other 1D port layouts with $N_2>1$ and $N_1=1$. An illustration of 2D antenna port layout is shown in FIG. 12 for M=1, 2, and 4 antenna panels. For a dual-polarized antenna port layout, the total number of antenna ports is $2MN_1N_2$. The single antenna panel (M=1) is assumed in the rest of the present disclosure. The embodiments of the present disclosure are general and are applicable to multiple antenna panels (M>1).

In one embodiment, a dual-stage $W=W_1W_2$ codebook for high-resolution CSI reporting is provided. In one example of such embodiment, $W_1$ codebook is used to select: an orthogonal basis set comprising of uniformly spaced $(L_1,L_2)$ DFT beams; $L \in \{2,3,4,6,8\}$ beams freely out of the $L_1L_2$ DFT beams in a basis set; and per layer strongest beam out of L beams and two polarizations. In such example, L is either (e.g. RRC) configurable or UE reports a preferred L value. This selection is WB or partial band (e.g. a set of SBs). Two examples of basis set sizes are restricted orthogonal basis set in which $L_1L_2=\min(8, N_1N_2)$ and full orthogonal basis set in which $L_1L_2=N_1N_2$, one of the two is either supported in the specification or configured via RRC signalling. For layer l, the basis comprising of L $W_1$ beams is given by $$B_l = [b_{k_{1,l}^{(0)},k_{2,l}^{(0)}}, \dots, b_{k_{1,l}^{(L-1)},k_{2,l}^{(L-1)}}],$$

where, $b_{k_1,k_2}$ is a 2D DFT beam, $B_l^H B_l = I$ and $\{(k_{1,l}^{(i)}, k_{2,l}^{(i)}): i, 0, 1 \dots, L-1\}$ are indices of L beams after sorting them so that beam $(k_{1,l}^{(0)}, k_{2,l}^{(0)})$ is the strongest beam for layer l. Note that for rank>1, the strongest beam index can be different for different layers, hence the index of the strongest beam is indicated per layer and this indication is WB.

In another example of such embodiments, $W_2$ codebook is used to combine L beams independently per layer with a common $W_1$ beam group, i.e., the selected L beams are the same for all layers and two polarizations, but strongest beam selection is per layer. The amplitude and phase of the combining coefficients are reported separately where phase is reported per SB and amplitude is reported WB or SB or both WB and SB. The amplitude scaling matrix $A_{r,l}$ is a L×L diagonal matrix with diagonal elements in [0,1] which correspond to amplitudes of L coefficients for polarization r and layer l. The phase of coefficients for polarization r and layer l is given by $c_{r,l}=[c_{r,l,0}, \ldots, c_{r,l,L-1}]$, where $$c_{r,l,i} = \exp\left(\frac{j2\pi n}{2^N}\right) \forall r, l, i; N \in \{2, 3\}.$$

For rank 1 and rank 2, the precoders are given by $$W = \begin{bmatrix} \tilde{w}_{0,0} \\ \tilde{w}_{1,1} \end{bmatrix} \text{ and } W = \begin{bmatrix} \tilde{w}_{00} & \tilde{w}_{0,1} \\ \tilde{w}_{1,0} & \tilde{w}_{1,1} \end{bmatrix},$$

where $$\tilde{w}_{r,l} = B_l P_{r,l} c_{r,l} = \sum_{i=0}^{L-1} b_{1,d}^{(i)} k_{2,l}^{(i)} \cdot p_{r,l,i} \cdot c_{r,l,i}; = 0, 1, l = 0, 1,$$

where $k_1 = O_1 n_1 + q_1$, $n_1 = 0, 1, \ldots N_1-1$, $q_1 = 0, 1, \ldots, O_1-1$ and $k_2 = O_2 n_2 + q_2$, $n_2 = 0, 1, \ldots N_2-1$, $q_2 = 0, 1, \ldots, O_2-1$, where $O_1$ and $O_2$ are oversampling factors in the first and the second dimensions, respectively.

Two alternatives for L beam reporting were also provided (assuming $(L_1, L_2)=(N_1, N_2)$): In one example of Joint reporting, L beams are reported jointly using $$B = \left\lceil \log_2 \binom{N_1 N_2}{L} \right\rceil$$

bits. In another example of Independent reporting, L beams are reported independently per beam using $B = L\lceil \log_2 (N_1 N_2) \rceil$ bits.

The focus of the present disclosure is on the details about the joint reporting of L beams.

Figure 13:
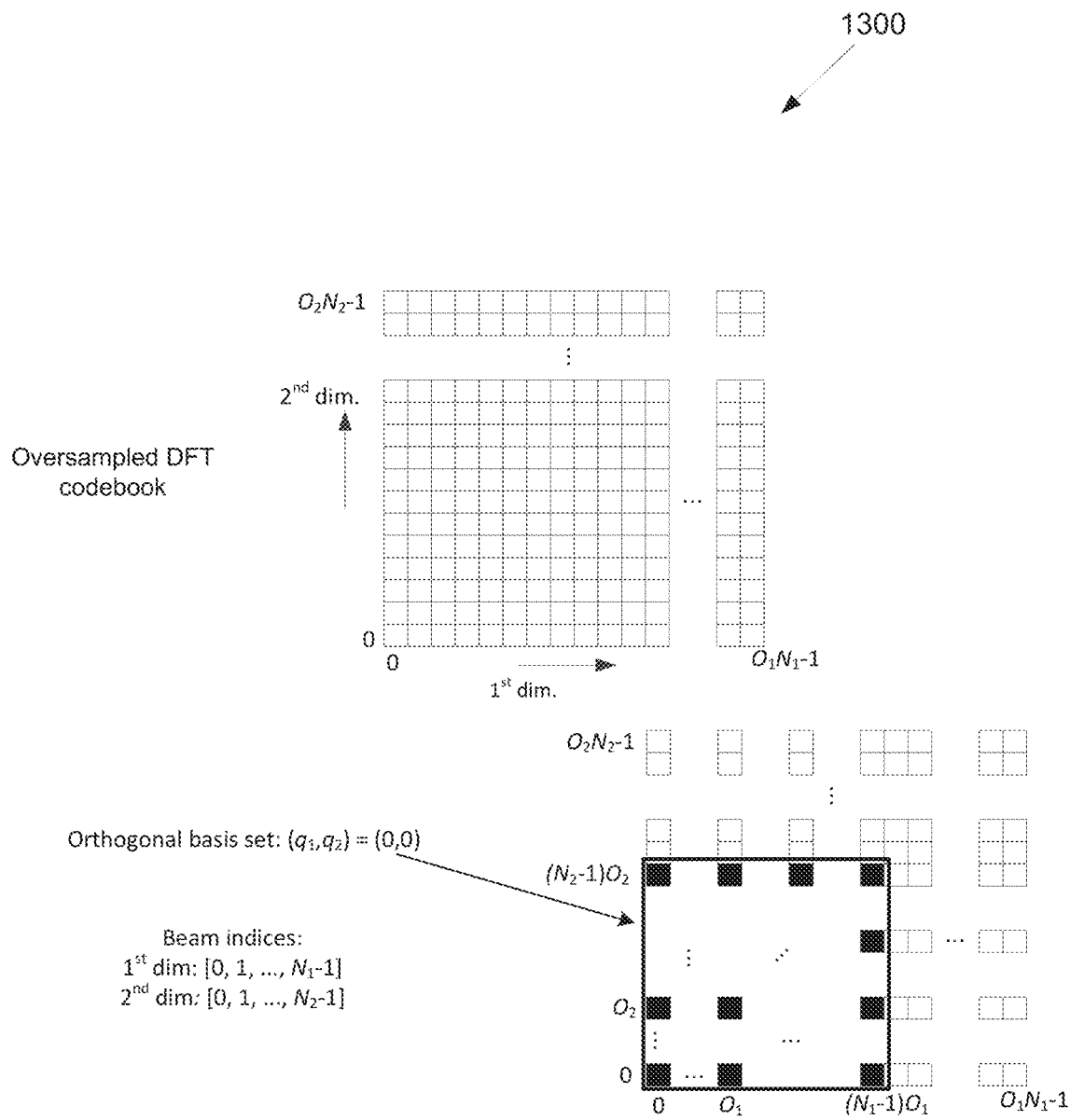
FIG. 13 illustrates an example orthogonal basis set according to embodiments of the present disclosure.

FIG. 13 illustrates an example orthogonal basis set 1300 according to embodiments of the present disclosure. The embodiment of the orthogonal basis set 1300 illustrated in FIG. 13 is for illustration only. FIG. 13 does not limit the scope of this disclosure to any particular implementation.

In embodiment 1, the L DFT beams or DFT vectors for combination are selected or identified by the three components $i_{1,1}$, $i_{1,2}$, and $i_{1,3}$ of the codebook index $i_1$, where $$i_{1,1} = q_1 \in \{0, 1, \ldots, O_1 - 1\}$$

$$i_{1,2} = q_2 \in \{0, 1, \ldots, O_2 - 1\}$$

indicates the orthogonal basis set comprising of $N_1 N_2$ DFT beams, an example of which is shown in FIG. 13.

For $(q_1, q_2) = (0, 0)$ where beams are shown as black squares located in an $(N_1, N_2)$ grid, and $$i_{1,3} \in \left\{0, 1, \ldots, \binom{N_1 N_2}{L}\right\}$$

indicating $[n_1 \ n_2]$, where $$n_1 = [n_1^{(0)}, \ldots, n_1^{(L-1)}]$$
$$n_2 = [n_2^{(0)}, \ldots, n_2^{(L-1)}]$$
$$n_1^{(i)} \in \{0, 1, \ldots, N_1 - 1\}$$
$$n_2^{(i)} \in \{0, 1, \ldots, N_2 - 1\}$$

where the quantities $n_1^{(i)}$ and $n_2^{(i)}$ indicate the indices of the i-th beam in the first and the second dimensions, respectively.

Alternatively, the L DFT beams or DFT vectors for combination are selected or identified by the two components $i_{1,1}$ and $i_{1,2}$ of the codebook index $i_1$, where $$i_{1,1} = [q_1 \ q_2]$$

$$q_1 \in \{0, 1, \ldots, O_1 - 1\}$$
$$q_2 \in \{0, 1, \ldots, O_2 - 1\} \text{ and } i_{1,2} \in \left\{0, 1, \ldots, \binom{N_1 N_2}{L}\right\}$$

indicating $[n_1 \ n_2]$.

In the present disclosure, the former (three components) are assumed, but the embodiments are general and are applicable to the later (two components) by simply replacing $(i_{1,1}, i_{1,2})$ with $i_{1,1}$, and, $i_{1,3}$ with $i_{1,2}$.

For $i = 0, 1, \ldots, L-1$, the L DFT vectors for linear combination are the given by $$v_{l,m} = \left[ u_m \ e^{j\frac{2\pi l}{O_1 N_1}} u_m \ \ldots \ e^{j\frac{2\pi l(N_1-1)}{O_1 N_1}} u_m \right]^T$$

$$vm_1^{(i)}, m_2^{(i)}, \text{ where } u_m = \begin{cases} \left[1 \ e^{j\frac{2\pi m}{O_2 N_2}} \ \ldots \ e^{j\frac{2\pi m(N_2-1)}{O_2 N_2}}\right] & N_2 > 1 \\ 1 & N_2 = 1 \end{cases},$$

the quantities $m_1^{(i)}$ and $m_2^{(i)}$ are given by $$m_1^{(i)} = O_1 n_1^{(i)} + q_1$$
$$m_2^{(i)} = O_2 n_2^{(i)} + q_2$$

and correspond to the DFT beam indices in the oversampled DFT codebook.

The beam indices $(n_1^{(i)}, n_2^{(i)})$ for $i = 0, 1, \ldots, L-1$ are reported jointly using $i_{1,3}$. TABLE 1 summarizes an example of the range of values for $i_{1,3}$ reporting for $L = 2, 3, 4$ and $N_1 N_2 = 2, 4, 6, 8, 12, 16$. TABLE 2 summarizes additional example of the range of values for $i_{1,3}$ reporting for $L = 6, 8$ and $N_1 N_2 = 8, 12, 16$.

TABLE 1

The range of $i_{1,3}$ reporting for joint reporting of L beams

| $N_1 N_2$ | L | $\binom{N_1 N_2}{L}$ (number of combinations) | $\left\lceil \log_2 \binom{N_1 N_2}{L} \right\rceil$ (number of bits) | $i_{1,3}$: $0, 1, \ldots, \binom{N_1 N_2}{L} - 1$ |
|---|---|---|---|---|
| 2 | 2 | 1 | 0 | 0 |
| 4 | 2 | 6 | 3 | 0, 1, ..., 5 |

TABLE 1-continued

The range of $i_{1,3}$ reporting for joint reporting of L beams

| $N_1N_2$ | L | $\binom{N_1N_2}{L}$ (number of combinations) | $\left\lceil \log_2\binom{N_1N_2}{L} \right\rceil$ (number of bits) | $i_{1,3}$: 0, 1, ... , $\binom{N_1N_2}{L}$ −1 |
|---|---|---|---|---|
|  | 3 | 4 | 2 | 0, 1, ... , 3 |
|  | 4 | 1 | 0 | 0 |
| 6 | 2 | 15 | 4 | 0, 1, ... , 14 |
|  | 3 | 20 | 5 | 0, 1, ... , 19 |
|  | 4 | 15 | 4 | 0, 1, ... , 14 |
| 8 | 2 | 28 | 5 | 0, 1, ... , 27 |
|  | 3 | 56 | 6 | 0, 1, ... , 55 |
|  | 4 | 70 | 7 | 0, 1, ... , 69 |
| 12 | 2 | 66 | 7 | 0, 1, ... , 65 |
|  | 3 | 220 | 8 | 0, 1, ... , 219 |
|  | 4 | 495 | 9 | 0, 1, ... , 494 |
| 16 | 2 | 120 | 7 | 0, 1, ... , 119 |
|  | 3 | 560 | 10 | 0, 1, ... , 559 |
|  | 4 | 1820 | 11 | 0, 1, ... , 1819 |

TABLE 2

The range of $i_{1,3}$ reporting for joint reporting of L beams

| $N_1N_2$ | L | $\binom{N_1N_2}{L}$ (number of combinations) | $\left\lceil \log_2\binom{N_1N_2}{L} \right\rceil$ (number of bits) | $i_{1,3}$: 0, 1, ... , $\binom{N_1N_2}{L}$ −1 |
|---|---|---|---|---|
| 8 | 6 | 28 | 5 | 0, 1, ... , 27 |
|  | 8 | 1 | 0 | 0 |
| 12 | 6 | 924 | 10 | 0, 1, ... , 65 |
|  | 8 | 495 | 9 | 0, 1, ... , 494 |
| 16 | 6 | 8008 | 13 | 0, 1, ... , 8007 |
|  | 8 | 12870 | 14 | 0, 1, ... , 12869 |

For the L out $N_1N_2$ beam selection, the $N_1N_2$ beams in the orthogonal basis set, indicated by $(i_{1,1}, i_{1,2}) = (q_1, q_2)$, are sorted or numbered according to at least one of the following schemes.

In one example of scheme 0, starting from the leading beam $(q_1, q_2)$, $N_1N_2$ beams in the orthogonal basis set are sorted or numbered seqentially 0 to $N_1N_2 − 1$ first in the 1st dimension and then in the 2nd dimension. For a given beam $(n_1^{(i)}, n_2^{(i)})$ in the orthogonal basis set, the sorted beam index is then given by $n^{(i)} = N_1 n_2^{(i)} + n_1^{(i)}$ where the indices $i = 0, 1, \ldots, L − 1$ are assigned such that $n^{(i)}$ increases as $i$ increases.

In another example of scheme 1, starting from the leading beam $(q_1, q_2)$, $N_1N_2$ beams are numbered seqentially 0 to $N_1N_2 − 1$ first in the 2nd dimension and then in the 1st dimension. For a given beam $(n_1^{(i)}, n_2^{(i)})$ in the orthogonal basis set, the sorted beam index is then given by $n^{(i)} = N_2 n_1^{(i)} + n_2^{(i)}$ where the indices $i = 0, 1, \ldots, L − 1$ are assigned such that $n^{(i)}$ increases as $i$ increases. The sorted beam indices $n^{(i)} \in \{0, 1, \ldots, N_1N_2 − 1\}$.

Figure 14:
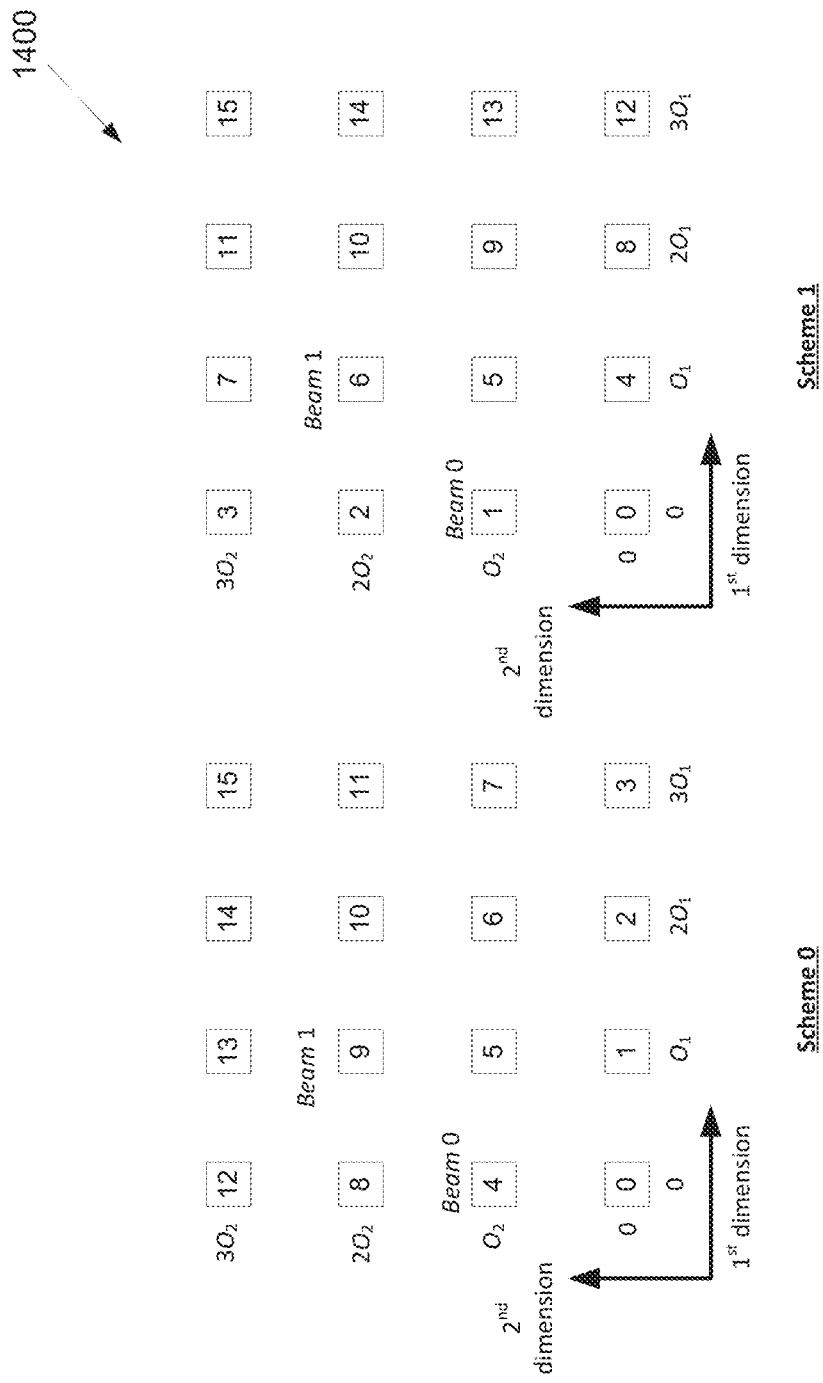
FIG. 14 illustrates an example beam sorting scheme according to embodiments of the present disclosure.

FIG. 14 illustrates an example beam sorting scheme 1400 according to embodiments of the present disclosure. The embodiment of the beam sorting scheme 1400 illustrated in FIG. 14 is for illustration only. FIG. 14 does not limit the scope of this disclosure to any particular implementation.

An illustration of the two beam sorting (numbering) schemes are shown in FIG. 14. An example of L=2 out of $N_1N_2=16$ beam selection is also shown according to the two schemes, where $(n_1^{(0)}, n_2^{(0)}) = (0,1)$ for Beam 0 and, $(n_1^{(1)}, n_2^{(1)}) = (1,2)$ for Beam 1. According to Scheme 0, Beam 0 and Beam 1 are numbered as $n^{(0)} = 4$ and $n^{(1)} = 9$, respectively, and according to Scheme 1, the Scheme 0, Beam 0 and Beam 1 are numbered as $n^{(0)} = 1$ and $n^{(1)} = 6$, respectively.

The beam indices $(n_1^{(i)}, n_2^{(i)})$ in the orthogonal basis set can be obtained from the sorted (numbered) beam indices $n^{(i)}$ as follows. In one example of Scheme 0: $n_1^{(i)} = n^{(i)} \bmod N_1$ and $$n_2^{(i)} = \left\lfloor \frac{n^{(i)}}{N_1} \right\rfloor \text{ or } n_2^{(i)} = \frac{(n^{(i)} - n_1^{(i)})}{N_1}.$$

In another example of Scheme 1: $n_2^{(i)} = n_{(i)} \bmod N_2$ and $$n_1^{(i)} = \left\lfloor \frac{n^{(i)}}{N_2} \right\rfloor \text{ or } n_1^{(i)} = \frac{(n^{(i)} - n_2^{(i)})}{N_2}.$$

The selected L beams, $n^{(0)}, n^{(1)}, \ldots, n^{(L-1)}$, are the then reported using $i_{1,3}$ according to the combinatorial numbering system, $$i_{1,3} = \binom{N_1N_2 - 1 - n^{(0)}}{L} + \binom{N_1N_2 - 1 - n^{(1)}}{L-1} + \ldots + \binom{N_1N_2 - 1 - n^{(L-1)}}{1} = \sum_{i=0}^{L-1} \binom{N_1N_2 - 1 - n^{(i)}}{L-i},$$

where $$\binom{x}{y}$$

(i.e., x choose y) is the combinatorial binomial coefficient defined as $$\binom{x}{y} = \frac{x!}{y!(x-y)!}$$

if $x \geq y$ and $$\binom{x}{y} = 0$$

if $x < y$, where $x! = x \times (x-1) \times (x-2) \times \ldots \times 1$ is the factorial function.

For a given values of L and $N_1N_2$, the combinatorial binomial coefficients $$\binom{N_1N_2 - 1 - n^{(i)}}{L - i}$$

can be stored in a table for all $n^{(i)} = 0, 1, \ldots, N_1N_2 − 1$ and $i = 0, 1, \ldots, L − 1$.

An illustration of such a table is shown in TABLE 3. For a given L∈{2,3,4}, the last L columns, i.e., column 4−L+1 to column 4 are used, which corresponds to columns y=L, . . . , 1 in the TABLE 3. Similarly, for a given $N_1N_2 \in \{2,4,6,8,12,16\}$, the first $N_1N_2$ rows, i.e., row 1 to row $N_1N_2$ are used, which correspond to rows x=0, 1, . . . , $N_1N_2-1$ in the TABLE 3.

The mapping of sorted beams $n^{(0)}, n^{(1)}, \ldots, n^{(L-1)}$ to index $i_{1,3}$ is performed as follows: iterate the following over i=0, 1, . . . , L−1, obtain $d_i=C(x,y)$ using TABLE 3, where $x=N_1N_2-1-n^{(i)}$ and y=L−i, i.e., $d_i=C(N_1N_2-1-n^{(i)}, L-i)$; and $$i_{1,3} = \sum_{i=0}^{L-1} d_i.$$

The reverse mapping of index $i_{1,3}$ to sorted beams $n^{(0)}, n^{(1)}, \ldots, n^{(L-1)}$ is performed as follows: initialize $s_{-1}=0$; and iterate the following steps over i=0, 1, . . . , L−1 using TABLE 3, find the largest $x \in \{0, 1, \ldots, N_1N_2-1\}$ such that $i_{1,3}-s_{i-1} > C(x,y)$ where y=L−i; let x* be the corresponding largest x, $e_i=C(x^*, L-i)$, $s_i=s_{i-1}+e_i$, $n^{(i)}=N_1N_2-1-x^*$.

In an alternate embodiment, the condition $i_{1,3}-s_{i-1} > C(x,y)$ is replaced with $i_{1,3}-s_{i-1} \geq C(x,y)$. In an alternate embodiment, $x \in \{0, 1, \ldots, N_1N_2-1\}$ is replaced with $x \in \{L-1-i, \ldots, N_1N_2-1-i\}$.

TABLE 3

Combinatorial binomial coefficients $C(x, y) = \binom{x}{y}$

| x | y=4 | y=3 | y=2 | y=1 |
|---|-----|-----|-----|-----|
| 0  | 0    | 0   | 0   | 0   |
| 1  | 0    | 0   | 0   | 1   |
| 2  | 0    | 0   | 1   | 2   |
| 3  | 0    | 1   | 3   | 3   |
| 4  | 1    | 4   | 6   | 4   |
| 5  | 5    | 10  | 10  | 5   |
| 6  | 15   | 20  | 15  | 6   |
| 7  | 35   | 35  | 21  | 7   |
| 8  | 70   | 56  | 28  | 8   |
| 9  | 126  | 84  | 36  | 9   |
| 10 | 210  | 120 | 45  | 10  |
| 11 | 330  | 165 | 55  | 11  |
| 12 | 495  | 220 | 66  | 12  |
| 13 | 715  | 286 | 78  | 13  |
| 14 | 1001 | 364 | 91  | 14  |
| 15 | 1365 | 455 | 105 | 15  |

In one embodiment 1A, the L beam selection and reporting are performed as explained in embodiment 1 except that the binomial coefficient table is replaced with TABLE 4. Note that some of entries of TABLE 4 are empty since these entries are not used.

TABLE 4

Combinatorial binomial coefficients $C(x, y) = \binom{x}{y}$

| x | y=4 | y=3 | y=2 | y=1 |
|---|-----|-----|-----|-----|
| 0  |      |     |     | 0   |
| 1  | 0    |     |     | 1   |
| 2  | 0    | 0   | 1   | 2   |
| 3  | 0    | 1   | 3   | 3   |
| 4  | 1    | 4   | 6   | 4   |
| 5  | 5    | 10  | 10  | 5   |
| 6  | 15   | 20  | 15  | 6   |
| 7  | 35   | 35  | 21  | 7   |
| 8  | 70   | 56  | 28  | 8   |
| 9  | 126  | 84  | 36  | 9   |
| 10 | 210  | 120 | 45  | 10  |
| 11 | 330  | 165 | 55  | 11  |
| 12 | 495  | 220 | 66  | 12  |
| 13 | 715  | 286 | 78  | 13  |
| 14 | 1001 | 364 | 91  | 14  |
| 15 | 1365 | 455 | 105 |     |

In one embodiment 2, the L beam selection and reporting are performed as explained in embodiment 1 except that the binomial coefficient table is replaced with TABLE 5. Note that the ordering of columns are revered when compared with TABLE 3. In this case, for a given L∈{2,3,4}, the first L columns, i.e., column 1 to column L are used, which corresponds to columns y=1, . . . , L in TABLE 5. Also, for a given $N_1N_2 \in \{2,4,6,8,12,16\}$, the first $N_1N_2$ rows, i.e., row 1 to row $N_1N_2$ are used, which correspond to rows x=0, 1, . . . , $N_1N_2-1$ in TABLE 5.

TABLE 5

Combinatorial binomial coefficients $C(x, y) = \binom{x}{y}$

| x | y=1 | y=2 | y=3 | y=4 |
|---|-----|-----|-----|-----|
| 0  | 0   | 0   | 0   | 0    |
| 1  | 1   | 0   | 0   | 0    |
| 2  | 2   | 1   | 0   | 0    |
| 3  | 3   | 3   | 1   | 0    |
| 4  | 4   | 6   | 4   | 1    |
| 5  | 5   | 10  | 10  | 5    |
| 6  | 6   | 15  | 20  | 15   |
| 7  | 7   | 21  | 35  | 35   |
| 8  | 8   | 28  | 56  | 70   |
| 9  | 9   | 36  | 84  | 126  |
| 10 | 10  | 45  | 120 | 210  |
| 11 | 11  | 55  | 165 | 330  |
| 12 | 12  | 66  | 220 | 495  |
| 13 | 13  | 78  | 286 | 715  |
| 14 | 14  | 91  | 364 | 1001 |
| 15 | 15  | 105 | 455 | 1365 |

In one embodiment 2A, the L beam selection and reporting are performed as explained in embodiment 1 except that the binomial coefficient table is replaced with TABLE 6. Note that some of entries of the TABLE 6 are empty since these entries are not used.

TABLE 6

Combinatorial binomial coefficients $C(x, y) = \binom{x}{y}$

| | y | | | |
|---|---|---|---|---|
| x | 1 | 2 | 3 | 4 |
| 0 | 0 | 0 | 0 | |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | | 105 | 455 | 1365 |

In one embodiment 3, a separate combinatorial binomial coefficient table is defined for each of L=2, 3, and 4. The example tables are shown in TABLE 7, TABLE 8, and TABLE 9 for L=2, 3, and 4, respectively (based on TABLE 3). Similar tables can be constructed based on TABLE 4, TABLE 5, and TABLE 6.

TABLE 7

Combinatorial binomial coefficients $C(x, y) = \binom{x}{y}$ for L = 2

| | y | |
|---|---|---|
| x | 2 | 1 |
| 0 | 0 | 0 |
| 1 | 0 | 1 |
| 2 | 1 | 2 |
| 3 | 3 | 3 |
| 4 | 6 | 4 |
| 5 | 10 | 5 |
| 6 | 15 | 6 |
| 7 | 21 | 7 |
| 8 | 28 | 8 |
| 9 | 36 | 9 |
| 10 | 45 | 10 |
| 11 | 55 | 11 |
| 12 | 66 | 12 |
| 13 | 78 | 13 |
| 14 | 91 | 14 |
| 15 | 105 | 15 |

TABLE 8

Combinatorial binomial coefficients $C(x, y) = \binom{x}{y}$ for L = 3

| | y | | |
|---|---|---|---|
| x | 3 | 2 | 1 |
| 0 | 0 | 0 | 0 |
| 1 | 0 | 0 | 1 |
| 2 | 0 | 1 | 2 |
| 3 | 1 | 3 | 3 |
| 4 | 4 | 6 | 4 |
| 5 | 10 | 10 | 5 |

TABLE 8-continued

Combinatorial binomial coefficients $C(x, y) = \binom{x}{y}$ for L = 3

| | y | | |
|---|---|---|---|
| x | 3 | 2 | 1 |
| 6 | 20 | 15 | 6 |
| 7 | 35 | 21 | 7 |
| 8 | 56 | 28 | 8 |
| 9 | 84 | 36 | 9 |
| 10 | 120 | 45 | 10 |
| 11 | 165 | 55 | 11 |
| 12 | 220 | 66 | 12 |
| 13 | 286 | 78 | 13 |
| 14 | 364 | 91 | 14 |
| 15 | 455 | 105 | 15 |

TABLE 9

Combinatorial binomial coefficients $C(x, y) = \binom{x}{y}$ for L = 4

| | y | | | |
|---|---|---|---|---|
| x | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |
| 4 | 1 | 4 | 6 | 4 |
| 5 | 5 | 10 | 10 | 5 |
| 6 | 15 | 20 | 15 | 6 |
| 7 | 35 | 35 | 21 | 7 |
| 8 | 70 | 56 | 28 | 8 |
| 9 | 126 | 84 | 36 | 9 |
| 10 | 210 | 120 | 45 | 10 |
| 11 | 330 | 165 | 55 | 11 |
| 12 | 495 | 220 | 66 | 12 |
| 13 | 715 | 286 | 78 | 13 |
| 14 | 1001 | 364 | 91 | 14 |
| 15 | 1365 | 455 | 105 | 15 |

In one embodiment 4, a separate combinatorial binomial coefficient table is defined for each of $N_1N_2$=4, 6, 8, 12, and 16. The example tables are shown in TABLE 10 and TABLE 11, TABLE 12, TABLE 13, and TABLE 3 for $N_1N_2$=4, 6, 8, 12, and 16, respectively (based on TABLE 3). Similar tables can be constructed based on TABLE 4, TABLE 5, and TABLE 6. Note that for $N_1N_2$=2, there is no need for beam selection.

TABLE 10

Combinatorial binomial coefficients $C(x, y) = \binom{x}{y}$ for $N_1N_2$ = 4

| | y | | | |
|---|---|---|---|---|
| x | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |

TABLE 11

Combinatorial binomial coefficients $C(x, y) = \binom{x}{y}$ for $N_1N_2 = 6$

| x | y | | | |
|---|---|---|---|---|
|   | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |
| 4 | 1 | 4 | 6 | 4 |
| 5 | 5 | 10 | 10 | 5 |

TABLE 12

Combinatorial binomial coefficients $C(x, y) = \binom{x}{y}$ for $N_1N_2 = 8$

| x | y | | | |
|---|---|---|---|---|
|   | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |
| 4 | 1 | 4 | 6 | 4 |
| 5 | 5 | 10 | 10 | 5 |
| 6 | 15 | 20 | 15 | 6 |
| 7 | 35 | 35 | 21 | 7 |

TABLE 13

Combinatorial binomial coefficients $C(x, y) = \binom{x}{y}$ for $N_1N_2 = 12$

| x | y | | | |
|---|---|---|---|---|
|   | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |
| 4 | 1 | 4 | 6 | 4 |
| 5 | 5 | 10 | 10 | 5 |
| 6 | 15 | 20 | 15 | 6 |
| 7 | 35 | 35 | 21 | 7 |
| 8 | 70 | 56 | 28 | 8 |
| 9 | 126 | 84 | 36 | 9 |
| 10 | 210 | 120 | 45 | 10 |
| 11 | 330 | 165 | 55 | 11 |

In one embodiment 5, a separate combinatorial binomial coefficient table is defined for each of $N_1N_2=4, 6, 8, 12,$ and 16, and for each of $L=2, 3,$ and 4. Following embodiment 3 and 4, it is straightforward to construct these separate tables.

In one embodiment 6, the selected L beams, $n^{(0)}, n^{(1)}, \ldots, n^{(L-1)}$, belong to $\{1, 2, \ldots, N_1N_2\}$ (instead of $\{0, 1, \ldots, N_1N_2-1\}$) are reported using $i_{1,3}$ according to the combinatorial numbering system, $$i_{1,3} = \binom{N_1N_2 - n^{(0)}}{L} + \binom{N_1N_2 - n^{(1)}}{L-1} + \ldots + \binom{N_1N_2 - n^{(L-1)}}{1} =$$

-continued $$\sum_{i=0}^{L-1} \binom{N_1N_2 - n^{(i)}}{L - i},$$

where $$\binom{x}{y}$$

is defined in embodiment 1.

For a given values of L and $N_1N_2$, the combinatorial binomial coefficients $$\binom{N_1N_2 - n^{(i)}}{L - i}$$

can be stored in a table for all $n^{(i)}=0, 1, \ldots, N_1N_2$ and $i=0, 1, \ldots, L-1$. An illustration of such a table is shown in TABLE 4. Note that x=0 is also included in the table for the case when x<y. For a given $L \in \{2,3,4\}$, the last L columns, i.e., column 4−L+1 to column 4 are used, which corresponds to columns y=L, ..., 1 in the table. Similarly, for a given $N_1N_2 \in \{2,4,6,8,12,16\}$, the first $N_1N_2$ rows, i.e., row 1 to row $N_1N_2$ are used, which correspond to rows x=0, 1, ..., $N_1N_2-1$ in the table.

The mapping of sorted beams $n^{(0)}, n^{(1)}, \ldots, n^{(L-1)}$ to index $i_{1,3}$ is performed either as explained in embodiment 1 with input $n^{(i)}=n^{(i)}-1$ for $i=0, 1, \ldots, L-1$ or as follows: iterate the following over $i=0, 1, \ldots, L-1$, obtain $d_i=C(x,y)$ using TABLE 14, where $x=N_1N_2-n^{(i)}$ and $y=L-i$, i.e., $d_i=C(N_1N_2-n^{(i)}, L-i)$; and $$i_{1,3} = \sum_{i=0}^{L-1} d_i.$$

The reverse mapping of index $i_{1,3}$ to sorted beams $n^{(0)}, n^{(1)}, \ldots, n^{(L-1)}$ is performed either as explained in embodiment 1 with adding 1 to the output $n^{(0)}, n^{(1)}, \ldots, n^{(L-1)}$ or as follows: initialize; and iterate the following steps over $i=0, 1, \ldots, L-1$, using TABLE 14, find the largest $x \in \{0, 1, \ldots, N_1N_2\}$ such that $i_{1,3}-s_{i-1} > C(x,y)$ where $y=L-i$; let $x^*$ be the corresponding largest x, $e_i=C(x^*, L-i)$, $s_i=s_{i-1}+e_i$, and $n^{(i)}=N_1N_2-x^*+1$.

In one example, the condition $i_{1,3}-s_{i-1} > C(x,y)$ is replaced with $i_{1,3}-s_{i-1} \geq C(x,y)$. In another example, $x \in \{0, 1, \ldots, N_1N_2-1\}$ is replaced with $x \in \{L-1-i, \ldots, N_1N_2-1-i\}$.

TABLE 14

Combinatorial binomial coefficients $C(x, y) = \binom{x}{y}$

| x | y | | | |
|---|---|---|---|---|
|   | 4 | 3 | 2 | 1 |
| 0 | 0 | 0 | 0 | 0 |
| 1 | 0 | 0 | 0 | 1 |
| 2 | 0 | 0 | 1 | 2 |
| 3 | 0 | 1 | 3 | 3 |

TABLE 14-continued

Combinatorial binomial coefficients $C(x, y) = \binom{x}{y}$

| | y | | | |
|---|---|---|---|---|
| x | 4 | 3 | 2 | 1 |
| 4 | 1 | 4 | 6 | 4 |
| 5 | 5 | 10 | 10 | 5 |
| 6 | 15 | 20 | 15 | 6 |
| 7 | 35 | 35 | 21 | 7 |
| 8 | 70 | 56 | 28 | 8 |
| 9 | 126 | 84 | 36 | 9 |
| 10 | 210 | 120 | 45 | 10 |
| 11 | 330 | 165 | 55 | 11 |
| 12 | 495 | 220 | 66 | 12 |
| 13 | 715 | 286 | 78 | 13 |
| 14 | 1001 | 364 | 91 | 14 |
| 15 | 1365 | 455 | 105 | 15 |
| 16 | 1820 | 560 | 120 | 16 |

In one example, a table similar to TABLE 3 to TABLE 13 can be constructed in this case also.

In one embodiment 7, two alternate coefficient tables are shown in TABLE 15 and TABLE 16 for $L \in \{2, 3, \ldots, 8\}$.

TABLE 15

Combinatorial binomial coefficients $C(x, y) = \binom{x}{y}$

| | y | | | | | | | |
|---|---|---|---|---|---|---|---|---|
| x | 8 | 7 | 6 | 5 | 4 | 3 | 2 | 1 |
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 2 |
| 3 | 0 | 0 | 0 | 0 | 0 | 1 | 3 | 3 |
| 4 | 0 | 0 | 0 | 0 | 1 | 4 | 6 | 4 |
| 5 | 0 | 0 | 0 | 1 | 5 | 10 | 10 | 5 |
| 6 | 0 | 0 | 1 | 6 | 15 | 20 | 15 | 6 |
| 7 | 0 | 1 | 7 | 21 | 35 | 35 | 21 | 7 |
| 8 | 1 | 8 | 28 | 56 | 70 | 56 | 28 | 8 |
| 9 | 9 | 36 | 84 | 126 | 126 | 84 | 36 | 9 |
| 10 | 45 | 120 | 210 | 252 | 210 | 120 | 45 | 10 |
| 11 | 165 | 330 | 462 | 462 | 330 | 165 | 55 | 11 |
| 12 | 495 | 792 | 924 | 792 | 495 | 220 | 66 | 12 |
| 13 | 1287 | 1716 | 1716 | 1287 | 715 | 286 | 78 | 13 |
| 14 | 3003 | 3432 | 3003 | 2002 | 1001 | 364 | 91 | 14 |
| 15 | 6435 | 6435 | 5005 | 3003 | 1365 | 455 | 105 | 15 |

TABLE 16

Combinatorial binomial coefficients $C(x, y) = \binom{x}{y}$

| | y | | | | | | | |
|---|---|---|---|---|---|---|---|---|
| x | 1 | 2 | 3 | 4 | 5 | 6 | 7 | 8 |
| 0 | 0 | 0 | 0 | 0 | 0 | 0 | 0 | 0 |
| 1 | 1 | 0 | 0 | 0 | 0 | 0 | 0 | 0 |
| 2 | 2 | 1 | 0 | 0 | 0 | 0 | 0 | 0 |
| 3 | 3 | 3 | 1 | 0 | 0 | 0 | 0 | 0 |
| 4 | 4 | 6 | 4 | 1 | 0 | 0 | 0 | 0 |
| 5 | 5 | 10 | 10 | 5 | 1 | 0 | 0 | 0 |
| 6 | 6 | 15 | 20 | 15 | 6 | 1 | 0 | 0 |
| 7 | 7 | 21 | 35 | 35 | 21 | 7 | 1 | 0 |
| 8 | 8 | 28 | 56 | 70 | 56 | 28 | 8 | 1 |
| 9 | 9 | 36 | 84 | 126 | 126 | 84 | 36 | 9 |
| 10 | 10 | 45 | 120 | 210 | 252 | 210 | 120 | 45 |
| 11 | 11 | 55 | 165 | 330 | 462 | 462 | 330 | 165 |
| 12 | 12 | 66 | 220 | 495 | 792 | 924 | 792 | 495 |
| 13 | 13 | 78 | 286 | 715 | 1287 | 1716 | 1716 | 1287 |
| 14 | 14 | 91 | 364 | 1001 | 2002 | 3003 | 3432 | 3003 |
| 15 | 15 | 105 | 455 | 1365 | 3003 | 5005 | 6435 | 6435 |

In one embodiment 8, which is a generalization of the joint reporting of L out of $N_1 N_2$ beams according to the embodiments of this present disclosure (e.g. embodiment 1), L out of N qualities (e.g. DFT beams/vectors, DFT beam groups, etc.) are reported jointly using the provided combinatorial numbering method as follows. First, the N quantities are sorted (numbered) as $n^{(0)}, n^{(1)}, \ldots, n^{(N-1)}$ such that $n^{(i)}$ increases as i increases. For example, if the N qualities correspond to quantities in multi-dimension (e.g. two-dimension), then the N qualities can be sorted (numbered) following the numbering scheme in the aforementioned embodiment 1.

Then, to report any L quantities $n^{(0)}, n^{(1)}, \ldots, n^{(L-1)}$ jointly, the mapping of $n^{(0)}, n^{(1)}, \ldots, n^{(L-1)}$ to the reporting index I is performed as follows: iterate the following over $i=0, 1, \ldots, L-1$, obtain $d_i = C(x,y)$ using a combinatorial coefficient table (e.g. one of TABLE 3 to TABLE 16 or their simple extension by adding rows or/and columns if N>16 or/and L>8), where $x = N-1-n^{(i)}$ and $y = L-i$, i.e., $d_i = C(N-1-n^{(i)}, L-i)$; and $$I = \sum_{i=0}^{L-1} d_i.$$

The reverse mapping of index I to $n^{(0)}, n^{(1)}, \ldots, n^{(L-1)}$ is performed as follows: initialize $s_{-1}=0$; and iterate the following steps over $i=0, 1, \ldots, L-1$, using a combinatorial coefficient table (e.g. one of TABLE 3 to TABLE 16 or their simple extension by adding rows or/and columns if N>16 or/and L>8), find the largest $x \in \{0, 1, \ldots, N-1\}$ such that $I - s_{i-1} > C(x,y)$ where $y=L-i$; let $x^*$ be the corresponding largest x, $e_i = C(x^*, L-i)$, $s_i = s_{i-1} + e_i$ and $n^{(i)} = N-1-x^*$.

In one example, the condition $I - s_{i-1} > C(x,y)$ is replaced with $I - s_{i-1} \geq C(x,y)$. In another example, $x \in \{0, 1, \ldots, N-1\}$ is replaced with $x \in \{L-1-i, \ldots, N-1-i\}$.

In one example X, the UE is configured with higher layer parameters CodebookType set to 'TypeII' and CodebookSubsetRestriction that forms the bit sequence $B = B_0 B_1 B_2$ where bit sequences $B_0$, $B_1$, and $B_2$ are concatenated to form B. The bit sequence $B_0 = b_0^{(1)} b_0^{(0)}$ is used for RI restriction, where a bit value of zero indicates that PMI reporting is not allowed to correspond to any precoder associated with the bit. Bit $b_0^{(v-1)}$ is associated with all precoders for v layers ($v \in \{1, 2\}$). To define $B_1$ and $B_2$, first define the $O_1 O_2$ vector groups (or beam groups) $G(r_1, r_2)$ as $G(r_1, r_2) = \{v_{N_1 r_1 + x_1, N_2 r_2 + x_2}: x_1 = 0, 1, \ldots, N_1-1; x_2 = 0, 1, \ldots, N_2-1\}$ for $$r_1 \in \{0, 1, \ldots, O_1 - 1\}$$
$$r_2 \in \{0, 1, \ldots, O_2 - 1\}.$$

The UE may be configured with restrictions for P=4 vector groups indicated by $(r_1^{(k)}, r_2^{(k)})$ for k=0, 1, 2, 3 and identified by the group indices $g^{(k)} = O_1 r_2^{(k)} + r_1^{(k)}$ for k=0, 1, ..., 3, where the indices are assigned such that $g^{(k)}$ increases as k increases. The remaining vector groups are not restricted.

In one example, if $N_2=1$, $g^{(k)}=k$ for k=0, 1, ..., 3, and $B_1$ is empty (hence not transmitted or indicated).

In another example, if $N_2>1$, $B_1 = b_1^{(10)} \ldots b_1^{(0)}$ is the eleven bit binary representation of the integer $\beta_1$ where $b_1^{(10)}$ is the MSB and $b_1^{(0)}$ is the LSB. Note that $$\beta_1 = \sum_{k=0}^{3} C(O_1 O_2 - 1 - g^{(k)}, 4 - k),$$

for $O_1 = O_2 = 4$, and P=4, hence requires 11 bits for binary representation. The group indices $g^{(k)}$ and indicators $(r_1^{(k)}, r_2^{(k)})$ for k=0, 1, 2, 3 may be found from $\beta_1$ using the combinatorial numbering provided in this embodiment and by mapping the quantities $(O_1 O_2, P, k, g^{(k)}, r_1^{(k)}, r_2^{(k)} \beta_1)$ in this example (e.g., example X) to the quantities (N, L, i, $n^{(i)}$, $n_1^{(i)}$, $n_2^{(i)}$, I) in the aforementioned embodiment 8.

In particular, $\beta_1$ is found using $$r_2^{(k)} = \frac{\left(g^{(k)} - r_1^{(k)}\right)}{O_1}.$$

where C(x,y) is defined above. The group indices $g^{(k)}$ and indicators $(r_1^{(k)}, r_2^{(k)})$ for k=0, 1, 2, 3 may be found from $\beta_1$ using the algorithm: $s_{-1} = 0$ for k=0, ..., 3; and find the largest $x^* \in \{3-k, \ldots, O_1 O_2 - 1 - k\}$ such that $\beta_1 - s_{k-1} \geq C(x^*, 4-k)$, $e_k = C(x^*, 4-k)$, $s_k = s_{k-1} + e_k$, $g^{(k)} = O_1 O_2 - 1 - x^*$, $r_1^{(k)} = g^{(k)} \mod O_1$; and $$\beta_1 \in \left\{0, 1, \ldots, \binom{O_1 O_2}{P}\right\} = \{0, 1, \ldots, 1819\}$$

In another example (Example Y), the UE reports CSI in a single-slot where the CSI is encoded separately into multiple encoded parts and the transmission priority of each encoded part is different.

In one instance, the encoded parts that are used to identify the number of information bits in other encoded parts of the report have higher transmission priority.

In another instance, the higher priority parts are first included in a transmission in their entirety before the lower priority parts are included.

In yet another instance, the information bits and/or channel coded bits of a lower priority part is partially transmitted or not transmitted if the payload (the number bits associated with the lower priority part) exceeds the number of bits that can be accommodated (after the payload for the higher priority parts is subtracted out from the maximum that UCI can accommodate) within the PUSCH resources for UCI transmission (either explicitly or implicitly allocated to the UE).

If the lower priority part is partially transmitted, then the UE reports the set (indices) of SBs for which the CSI is reported for the lower priority parts. To report the SB indices, the combinatorial numbering as provided in this present disclosure (e.g. embodiment 8) is used where the reported SB combination index is given by $$i = \sum_{j=0}^{M-1} \binom{K - 1 - k_j}{M - j},$$

where K is the total number of SBs for which the UE is configured to report CSI, M is the number of SBs for which lower priority parts are transmitted partially, and $k_0, k_1, \ldots k_{M-1}$ are the indices of M selected SBs sorted in increasing order of i.

As an example, the multiple encoded parts correspond to two parts, part 1 and part 2 (or first part or second part) where part 1 corresponds to the higher priority part and part 2 corresponds to the lower priority part. The lower priority part (part 2) is transmitted in full (i.e. all CSI components are transmitted for all SBs) when RI=1 is transmitted in the higher priority part (part 1), and is transmitted partially when RI=2 is transmitted in the higher priority part (part 1).

Figure 15:
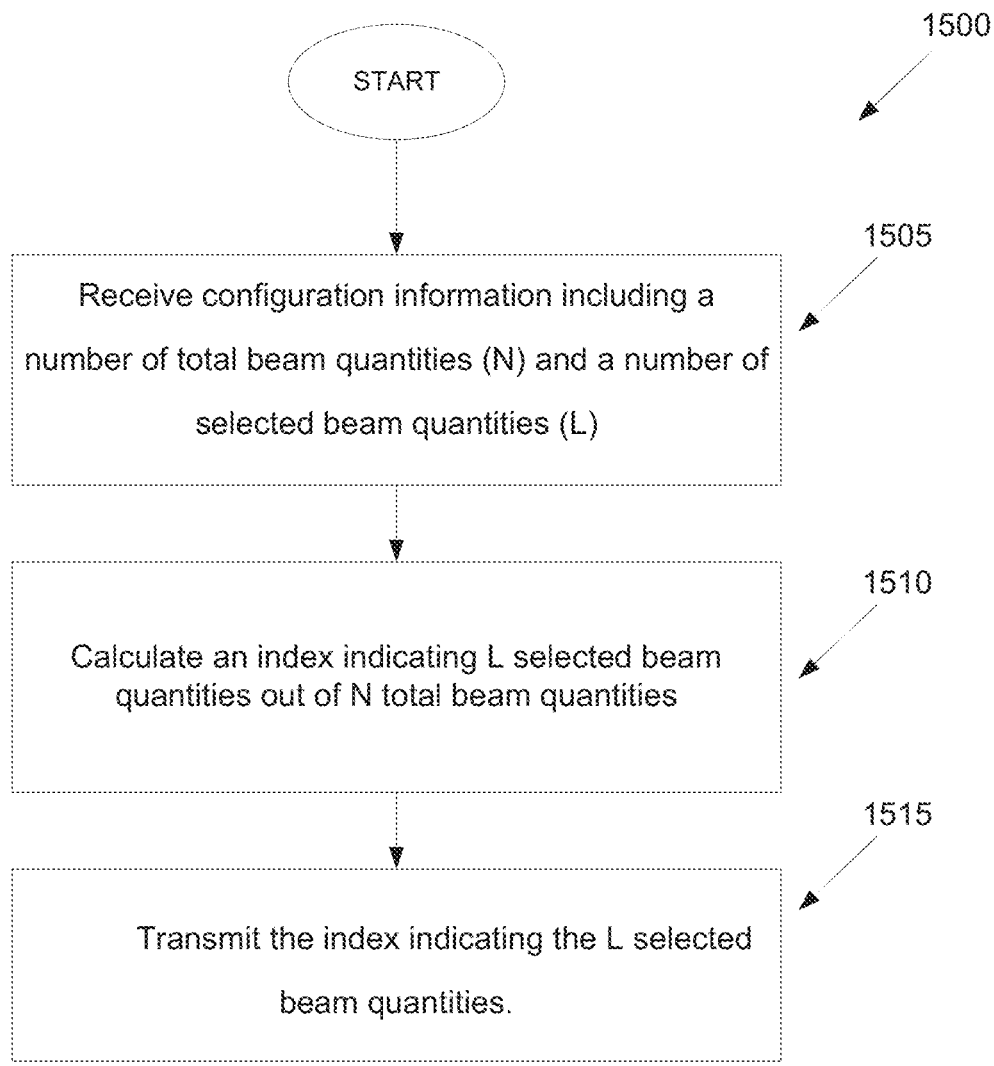
FIG. 15 illustrates a flowchart of a method for beam selection for CSI reporting according to embodiments of the present disclosure.

FIG. 15 illustrates a flowchart of a method 1500 for beam selection for CSI reporting according to embodiments of the present disclosure, as may be performed by a user equipment (e.g., 111-116 as illustrated in FIG. 1). The embodiment of the method 1500 illustrated in FIG. 15 is for illustration only. FIG. 15 does not limit the scope of this disclosure to any particular implementation.

As illustrated in FIG. 15, the method beings in step 1505. The UE in step 1505 receives, from a base station (BS), configuration information including a number of total beam quantities (N) and a number of selected beam quantities (L), wherein L≤N. In step 1510, a beam quantity corresponds to a discrete Fourier transform (DFT) vector, $N = N_1 N_2$, and the index indicating the L selected beam quantities corresponds to a precoding matrix indicator (PMI) index ($i_{1,2}$) given by $$i_{1,2} \in \left\{0, 1, \ldots, \binom{N_1 N_2}{L} - 1\right\}$$

where $N_1$ and $N_2$ included in the configuration information are a number of antenna ports with a given polarization in a first and second dimension of an antenna port layout at the BS, respectively.

In step, 1505, the predefined mapping table is given by:

| x | y | | | |
|---|---|---|---|---|
|   | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |

| | y | | | |
|---|---|---|---|---|
| x | 1 | 2 | 3 | 4 |
| 14 | 14 | 91 | 364 | 1001 |
| 15 | 15 | 105 | 455 | 1365 | where a first column from left corresponds to a range of values for x, a first row from top corresponds to a range of values for y, and a rest of entries in the predefined mapping table correspond to values for C(x,y).

In one embodiment, the index $$i_{1,2} = \sum_{i=0}^{L-1} d_i$$

where: $d_i = C(x,y)$ is obtained using the predefined mapping table with $x = N_1 N_2 - 1 - n^{(i)}$ and $y = L - i$, $n^{(i)} = N_1 n_2^{(i)} + n_1^{(i)}$ with indices $i = 0, 1, \ldots, L-1$ assigned to the L selected beam quantities such that $n^{(i)}$ increases as i increases, and $n_1^{(i)} \in \{0, 1, \ldots, N_1 - 1\}$ and $n_2^{(i)} \in \{0, 1, \ldots, N_2 - 1\}$ indicate the indices of a i-th of the L selected beam quantities in the first and second dimension, respectively.

In one embodiment, the L selected beam quantities are obtained from the PMI index $i_{1,2}$ by setting $s_{-1} = 0$, and iterating the following steps over $i = 0, \ldots, L-1$: obtain the largest row index $x^* \in \{L-1-i, \ldots, N_1 N_2 - 1 - i\}$ in the predefined mapping table such that $i_{1,2} - s_{i-1} \geq C(x^*, L-i)$, $e_i = C(x^*, L-i)$, $s_i = s_{i-1} + e_i$, $n^{(i)} = N_1 N_2 - 1 - x^*$, $n_1^{(i)} = n^{(i)} \mod N_1$, and $$n_2^{(i)} = \frac{(n^{(i)} - n_1^{(i)})}{N_1}.$$

In one embodiment, the configuration information includes a parameter CodebookType set to TypeII and a bitmap CodebookSubsetRestriction that includes a bit sequence $B_1$ representing an index $\beta_1$ that indicates the L selected beam quantities out of N total beam quantities based on the predefined mapping table, a beam quantity corresponding to a DFT vector group, and wherein L=4, N=$O_1 O_2$, and the index $$\beta_1 = \sum_{k=0}^{3} C(O_1 O_2 - 1 - g^{(k)}, 4 - k)$$

where $g^{(k)} = O_1 r_2^{(k)} + r_1^{(k)}$ with indices $k = 0, 1, \ldots, 3$ assigned to an L=4 selected beam quantities such that $g^{(k)}$ increases as k increases, and $r_1^{(k)} \in \{0, 1, \ldots, O_1 - 1\}$ and $r_2^{(k)} \in \{0, 1, \ldots, O_2 - 1\}$ indicate the indices of a k-th of the L selected beam quantities in a first and second dimension, respectively, and wherein $O_1$ and $O_2$ are oversampling factors in the first and second dimension, respectively.

In step 1510, the UE calculates an index indicating L selected beam quantities out of N total beam quantities based on the configuration information and a predefined mapping table including combinatorial binomial coefficient values, $$C(x,y) = \binom{x}{y}$$

(i.e., x choose y).

In step 1515, the UE transmits, to the BS, the index indicating the L selected beam quantities.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver configured to receive, from a base station (BS), configuration information including a number of total beam quantities (N) and a number of selected beam quantities (L), wherein L≤N; and
 a processor operably connected to the transceiver, the processor configured to calculate an index indicating L selected beam quantities out of N total beam quantities based on the configuration information and a mapping table including combinatorial binomial coefficient values, $$C(x,y) = \binom{x}{y}$$

(i.e., x choose y),
 wherein the transceiver is further configured to transmit, to the BS, the index indicating the L selected beam quantities.

2. The UE of claim 1, wherein a beam quantity corresponds to a discrete Fourier transform (DFT) vector, N=$N_1 N_2$, and the index indicating the L selected beam quantities corresponds to a precoding matrix indicator (PMI) index ($i_{1,2}$) given by:

$$i_{1,2} \in \left\{0, 1, \ldots, \binom{N_1 N_2}{L} - 1\right\},$$

where $N_1$ and $N_2$ included in the configuration information are a number of antenna ports with a given polarization in a first and second dimension of an antenna port layout at the BS, respectively.

3. The UE of claim 2, wherein the index $$i_{1,2} = \sum_{i=0}^{L-1} d_i,$$

where:
- $d_i = C(x, y)$ is obtained using the mapping table with $x = N_1N_2 - 1 - n^{(i)}$ and $y = L - i$,
- $n(i) = N_1 n_2^{(i)} + n_1^{(i)}$ with indices $i = 0, 1, \ldots, L-1$ assigned to the L selected beam quantities such that $n^{(i)}$ increases as i increases, and
- $n_1^{(i)} \in \{0, 1, \ldots, N_1 - 1\}$ and $n_2^{(i)} \in \{0, 1, \ldots, N_2 - 1\}$ indicate the indices of a i-th of the L selected beam quantities in the first and second dimension, respectively.

4. The UE of claim 2, wherein the L selected beam quantities are obtained from the PMI index $i_{1,2}$ by setting $s_{-1} = 0$, and iterating the following steps over $i = 0, 1, \ldots, L-1$:
obtain the largest row index $x^* \in \{L-1-i, \ldots, N_1N_2-1-i\}$ in the mapping table such that $i_{1,2} - s_{i-1} \geq C(x^*, L-i)$, $e_i = C(x^*, L-i)$, $s_i = s_{i-1} + e_i$, $n^{(i)} = N_1N_2 - 1 - x^*$, $n_1^{(i)} = n^{(i)} \mod N_1$, and $$n_2^{(i)} = \frac{(n^{(i)} - n_1^{(i)})}{N_1}.$$

5. The UE of claim 1, wherein the mapping table is given by:

| x | y 1 | 2 | 3 | 4 |
|---|---|---|---|---|
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 | where a first column from left corresponds to a range of values for x, a first row from top corresponds to a range of values for y, and a rest of entries in the mapping table correspond to values for $C(x, y)$.

6. The UE of claim 1, wherein the configuration information includes a parameter CodebookType set to TypeII and a bitmap CodebookSubsetRestriction that includes a bit sequence $B_1$ representing an index $\beta_1$ that indicates the L selected beam quantities out of N total beam quantities based on the mapping table, and wherein a beam quantity corresponds to a discrete Fourier transform (DFT) vector group.

7. The UE of claim 6, wherein L=4, $N = O_1O_2$, and the index $$\beta_1 = \sum_{k=0}^{3} C(O_1O_2 - 1 - g^{(k)}, 4 - k)$$

where:
- $g^{(k)} = O_1 r_2^{(k)} + r_1^{(k)}$ with indices $k = 0, 1, \ldots, 3$ assigned to an L=4 selected beam quantities such that $g^{(k)}$ increases as k increases,
- $r_1^{(k)} \in \{0, 1, \ldots, O_1 - 1\}$ and $r_2^{(k)} \in \{0, 1, \ldots, O_2 - 1\}$ indicate the indices of a k-th of the L selected beam quantities in a first and second dimension, respectively, and
- wherein $O_1$ and $O_2$ are oversampling factors in the first and second dimension, respectively.

8. A base station (BS) in a wireless communication system, the BS comprising:
a transceiver configured to:
transmit, to a user equipment (UE), configuration information including a number of total beam quantities (N) and a number of selected beam quantities (L), wherein $L \leq N$; and
receive, from the UE, an index indicating L selected beam quantities out of N total beam quantities based on the configuration information and a mapping table including combinatorial binomial coefficient values, $$C(x, y) = \binom{x}{y}$$

(i.e., x choose y).

9. The BS of claim 8, wherein a beam quantity corresponds to a discrete Fourier transform (DFT) vector, $N = N_1N_2$, and the index indicating the L selected beam quantities corresponds to a precoding matrix indicator (PMI) index ($i_{1,2}$) given by:

$$i_{1,2} \in \left\{0, 1, \ldots, \binom{N_1N_2}{L} - 1\right\},$$

where $N_1$ and $N_2$ included in the configuration information are a number of antenna ports with a given polarization in a first and second dimension of an antenna port layout at the BS, respectively.

10. The BS of claim 9, wherein the index $$i_{1,2} = \sum_{i=0}^{L-1} d_i,$$

where:
- $d_i = C(x, y)$ is obtained using the mapping table with $x = N_1N_2 - 1 - n^{(i)}$ and $y = L - i$,
- $n^{(i)} = N_1 n_2^{(i)} + n_1^{(i)}$ with indices $i = 0, 1, \ldots, L-1$ assigned to the L selected beam quantities such that $n^{(i)}$ increases as i increases, and
- $n_1^{(i)} \in \{0, 1, \ldots, N_1-1\}$ and $n_2^{(i)} \in \{0, 1, \ldots, N_2-1\}$ indicate the indices of a i-th of the L selected beam quantities in the first and second dimension, respectively.

11. The BS of claim 9, wherein the L selected beam quantities are obtained from the PMI index $i_{1,2}$ by setting $s_{-1} = 0$, and iterating the following steps over $i = 0, 1, \ldots, L-1$:
obtain the largest row index $x^* \in \{L-1-i, \ldots, N_1N_2-1-i\}$ in the mapping table such that $i_{1,2} - s_{i-1} \geq C(x^*, L-i)$, $e_i = C(x^*, L-i)$, $s_i = s_{i-1} + e_i$, $n^{(i)} = N_1N_2 - 1 - x^*$, $n_1^{(i)} = n^{(i)} \mod N_1$, and $$n_2^{(i)} = \frac{(n^{(i)} - n_1^{(i)})}{N_1}.$$

12. The BS of claim 8, wherein the mapping table is given by:

| x | y | | | |
|---|---|---|---|---|
|   | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 | where a first column from left corresponds to a range of values for x, a first row from top corresponds to a range of values for y, and a rest of entries in the mapping table correspond to values for C(x, y).

13. The BS of claim 8, wherein the configuration information includes a parameter CodebookType set to TypeII and a bitmap CodebookSubsetRestriction that includes a bit sequence $B_1$ representing an index $\beta_1$ that indicates the L selected beam quantities out of N total beam quantities based on the predefined mapping table, and wherein a beam quantity corresponds to a discrete Fourier transform (DFT) vector group.

14. The BS of claim 13, wherein L=4, N=$O_1O_2$, and the index $$\beta_1 = \sum_{k=0}^{3} C(O_1 O_2 - 1 - g^{(k)}, 4 - k)$$

where:
$g^{(k)} = O_1 r_2^{(k)} + r_1^{(k)}$ with indices k=0,1, . . . , 3 assigned to an L=4 selected beam quantities such that $g^{(k)}$ increases as k increases,
$r_1^{(k)} \in \{0,1, \ldots, O_1-1\}$ and $r_2^{(k)} \in \{0,1, \ldots, O_2-1\}$ indicate the indices of a k-th of the L selected beam quantities in a first and second dimension, respectively, and
wherein $O_1$ and $O_2$ are oversampling factors in the first and second dimension, respectively.

15. A method of a user equipment (UE) in a wireless communication system, the method comprising:
receiving, from a base station (BS), configuration information including a number of total beam quantities (N) and a number of selected beam quantities (L), wherein L≤N;
calculating an index indicating L selected beam quantities out of N total beam quantities based on the configuration information and a mapping table including combinatorial binomial coefficient values, $$C(x, y) = \binom{x}{y}$$

(i.e., x choose y); and
transmitting, to the BS, the index indicating the L selected beam quantities.

16. The method of claim 15, wherein a beam quantity corresponds to a discrete Fourier transform (DFT) vector, N=$N_1N_2$, and the index indicating the L selected beam quantities corresponds to a precoding matrix indicator (PMI) index ($i_{1,2}$) given by:

$$i_{1,2} \in \left\{0, 1, \ldots, \binom{N_1 N_2}{L} - 1\right\},$$

where $N_1$ and $N_2$ included in the configuration information are a number of antenna ports with a given polarization in a first and second dimension of an antenna port layout at the BS, respectively.

17. The method of claim 16, wherein the index $$i_{1,2} = \sum_{i=0}^{L-1} d_i,$$

where:
$d_i$=C(x, y) is obtained using the mapping table with x=$N_1N_2-1-n^{(i)}$ and y=L-i,
$n^{(i)}=N_1 n_2^{(i)} + n_1^{(i)}$ with indices i=0,1, . . . , L-1 assigned to the L selected beam quantities such that $n^{(i)}$ increases as i increases, and
$n_1^{(i)} \in \{0,1, \ldots, N_1-1\}$ and $n_2^{(i)} \in \{0,1, \ldots, N_2-1\}$ indicate the indices of a i-th of the L selected beam quantities in the first and second dimension, respectively.

18. The method of claim 16, wherein the L selected beam quantities are obtained from the PMI index $i_{1,2}$ by setting $s_{-1}$=0, and iterating the following steps over i=0, 1, . . . , L-1:
obtain the largest row index x*∈{L-1-i, . . . , $N_1N_2-1-i$} in the mapping table such that $i_{1,2}-s_{i-1}$≥C(x*, L-i), $e_i$=C(x*, L-i), $s_i=s_{i-1}+e_i$, $n^{(i)}=N_1N_2-1-x^*$, $n_1^{(i)}=n^{(i)}$ mod $N_1$, and $$n_2^{(i)} = \frac{(n^{(i)} - n_1^{(i)})}{N_1}.$$

19. The method of claim 15, wherein the mapping table is given by:

| x | y | | | |
|---|---|---|---|---|
|   | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |

-continued

| x | y | | | |
|---|---|---|---|---|
| | 1 | 2 | 3 | 4 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 | where a first column from left corresponds to a range of values for x, a first row from top corresponds to a range of values for y, and a rest of entries in the mapping table correspond to values for C(x, y).

20. The method of claim 15, wherein the configuration information includes a parameter CodebookType set to TypeII and a bitmap CodebookSubsetRestriction that includes a bit sequence $B_1$ representing an index $\beta_1$ that indicates the L selected beam quantities out of N total beam quantities based on the predefined mapping table, and wherein a beam quantity corresponds to a discrete Fourier transform (DFT) vector group, and wherein L=4, N=$O_1O_2$, and the index $$\beta_1 = \sum_{k=0}^{3} C(O_1O_2 - 1 - g^{(k)}, 4 - k)$$

where:
$g^{(k)}=O_1 r_2^{(k)}+r_1^{(k)}$ with indices k=0,1, . . . , 3 assigned to an L=4 selected beam quantities such that $g^{(k)}$ increases as k increases,
$r_1^{(k)} \in \{0,1, \ldots, O_1-1\}$ and $r_2^{(k)} \in \{0,1, \ldots, O_2-1\}$ indicate the indices of a k-th of the L selected beam quantities in a first and second dimension, respectively, and
wherein $O_1$ and $O_2$ are oversampling factors in the first and second dimension, respectively.

* * * * *